United States Patent [19]
Kelley, Jr.

[11] Patent Number: 4,517,635
[45] Date of Patent: May 14, 1985

[54] LINE-COMMUTATED CONVERTER CIRCUIT

[75] Inventor: Fred W. Kelley, Jr., Media, Pa.

[73] Assignee: General Electric Company, King of Prussia, Pa.

[21] Appl. No.: 423,481

[22] Filed: Sep. 24, 1982

[51] Int. Cl.$^3$ .......................................... H02M 7/757
[52] U.S. Cl. ..................................... 363/136; 363/40; 363/44; 363/128; 363/138
[58] Field of Search ............... 363/34, 35, 37, 128, 363/136, 137, 138, 39, 40, 44, 65, 67, 69; 323/207; 307/64, 66, 85, 86, 87

[56] References Cited

U.S. PATENT DOCUMENTS

| Re. 26,342 | 2/1968 | Bedford | 363/138 |
|---|---|---|---|
| 3,303,406 | 2/1967 | Bedford | 363/138 |
| 3,389,268 | 6/1968 | Jamieson et al. | 307/66 |
| 3,614,461 | 10/1971 | Speer | 307/87 |
| 3,986,098 | 10/1976 | Tamii et al. | 307/66 |
| 4,253,140 | 2/1981 | McMurray | 363/138 |
| 4,296,462 | 10/1981 | Gurr | 363/137 |
| 4,336,584 | 6/1982 | Careglio | 363/136 |
| 4,376,296 | 3/1983 | Bhagwat et al. | 363/136 |

OTHER PUBLICATIONS

Michel, "Converter Using External Commutation on the D.C. Side," IEEE-Power Electronics Specialists Conference Record, Jun. 14–17, 1982, pp. 143–148.

Beck et al., "Spannungsrickter–ein neuer Unrichtertyp . . .", etz–Archiv, Bd. 3, Dec. 1981, pp. 427–432.
Dissertation by H. P. Beck, "Fremdgefuhrter Zwischenkreisumrichter . . .", Technischen Universitat Berlin, Berlin, 1981.

Primary Examiner—Peter S. Wong
Assistant Examiner—Jeffrey Sterrett
Attorney, Agent, or Firm—William Freedman; John P. McMahon

[57] ABSTRACT

This line-commutated converter, in one form, has a pair of D.C. terminals for connection to a D.C. system and a pair of A.C. terminals for connection to an A.C. system. The converter comprises first, second, third, and fourth branches, each comprising the combination of a thyristor and a diode connected in inverse-parallel and an inductor connected in series with this combination. The first and fourth branches with a first node located therebetween are connected in series across the D.C. terminals; and the second and third branches with a second node located therebetween are also connected in series across the D.C. terminals. The nodes are effectively connected across the A.C. terminals. Controlled gating means simultaneously triggers the first and second branches into conduction at a controlled phase angle with respect to the A.C. system voltage and simultaneously triggers the third and fourth branches into conduction 180 degrees thereafter, repeating this sequence each cycle of the A.C. system voltage.

13 Claims, 19 Drawing Figures

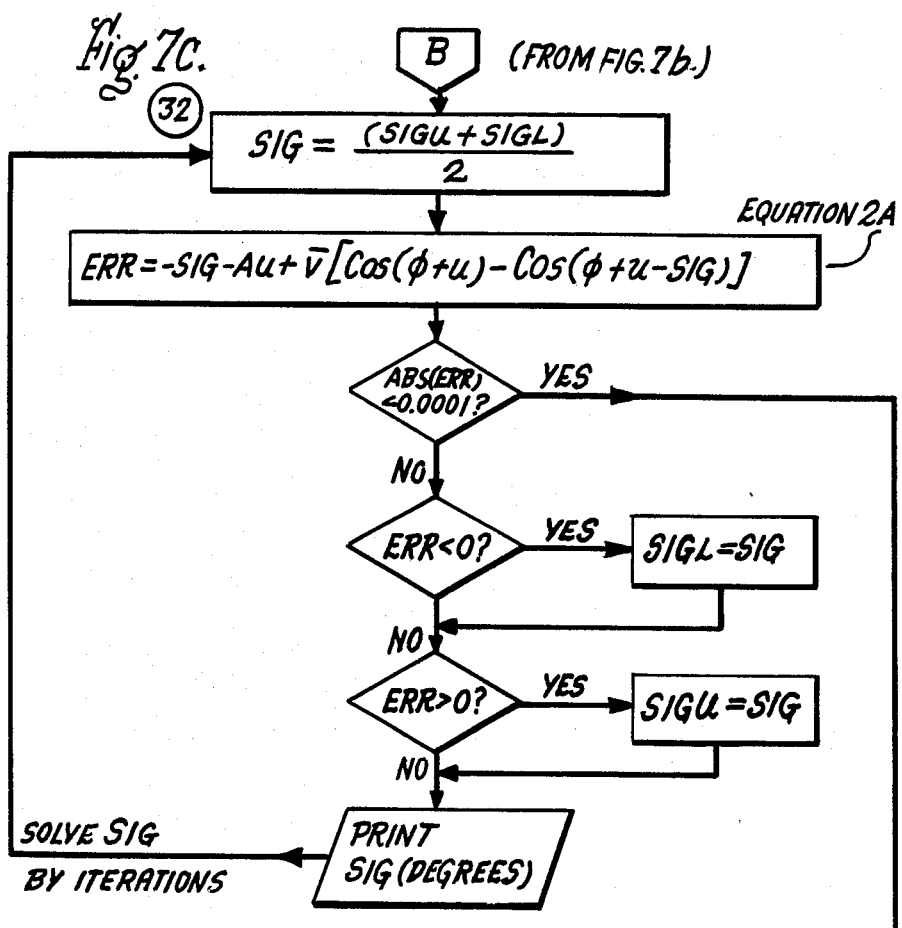
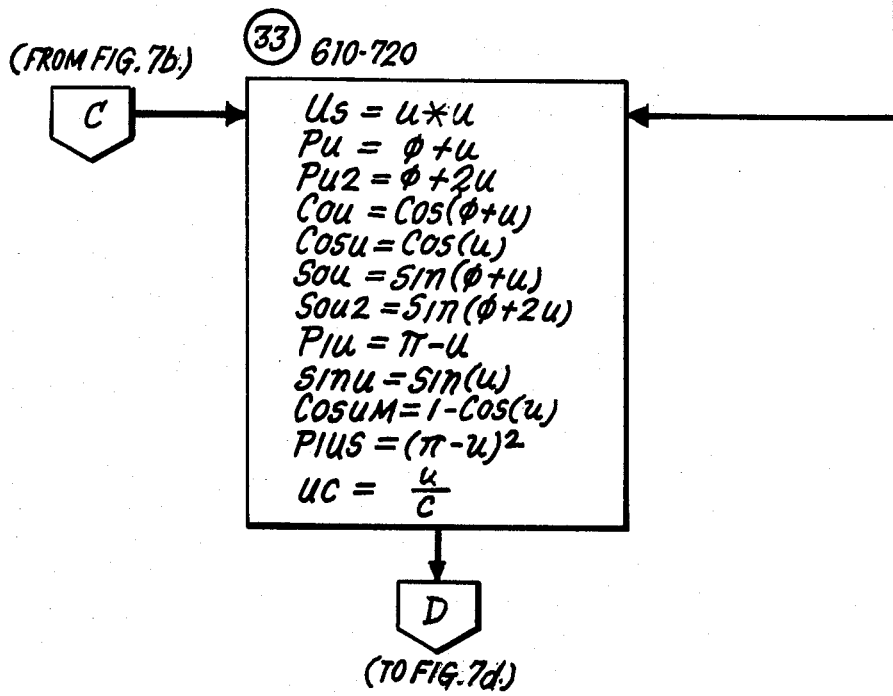
Fig. 7c.

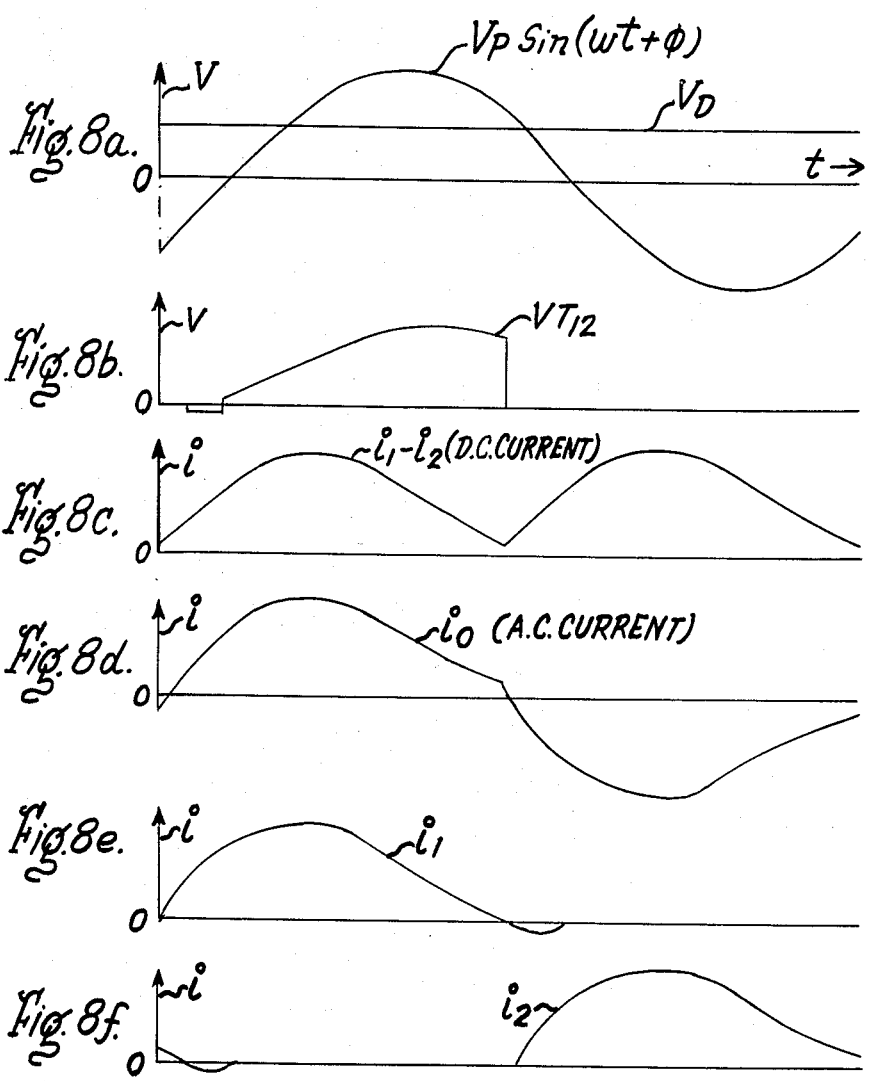

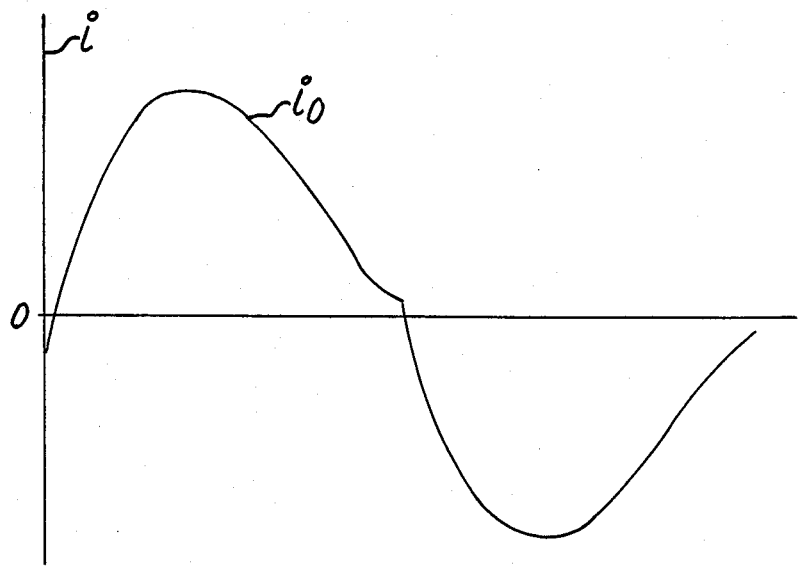
Fig.9a.
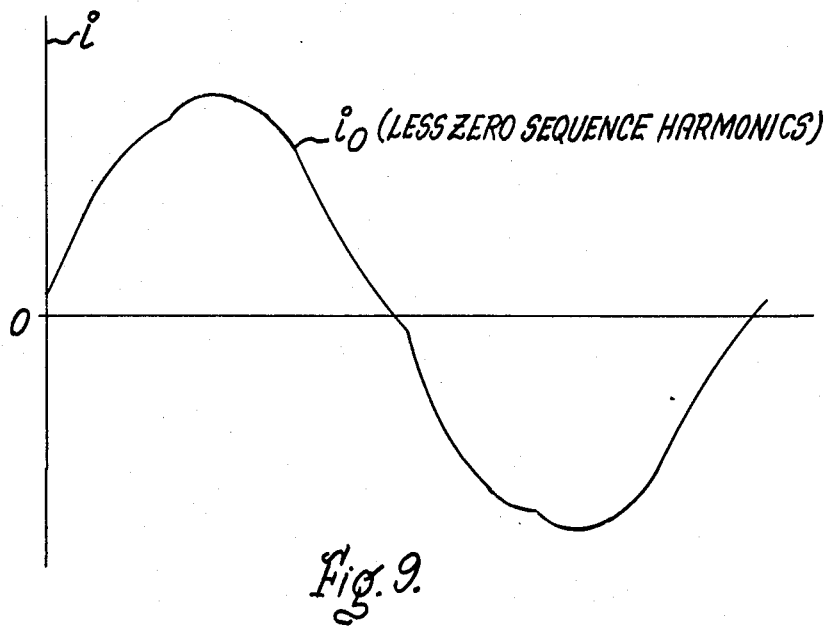
Fig.9b.
Fig.9.

LINE-COMMUTATED CONVERTER CIRCUIT

The Electric Power Research Institute, Palo Alto, California, has certain rights with respect to this invention pursuant to contract RP642-4 between the Electric Power Research Institute and General Electric Company.

BACKGROUND OF THE INVENTION

The present invention relates to means for converting electric power from either direct (D.C.) to alternating (A.C.) form or from alternating (A.C.) to direct (D.C.) form, and more particularly, it relates to an electrical power converting circuit that provides for control of the power flow in either direction between an A.C. system and a D.C. system.

A known inverting circuit is described in U.S. Pat. No. 3,406,327, issued Oct. 15, 1968 to N. W. Mapham et al, and entitled "Electric Power Inverter Having a Well Regulated, Nearly Sinusoidal Output Voltage". This patent describes a thyristor-controlled inverting circuit that operates to invert the voltage of a D.C. source to an A.C. output voltage. U.S. Pat. No. 3,406,327 further describes the A.C. output voltage as having a nearly sinusoidal waveform. Although the thyristor-controlled circuit of U.S. Pat. No. 3,406,327 serves well to accomplish its desired result, it is considered desirable in certain applications that a circuit be provided that performs both an inverting function, that is, it changes from D.C. to A.C., and a rectifying function, that is it changes from A.C. to D.C.

A circuit that performs both inverting and rectifying operations is commonly termed a converter, and one such converter is a "Graetz Converter". The Graetz converter is described in the text DIRECT CURRENT TRANSMISSION, Volume 1 of E. W. Kimbark published 1971 by John Wiley & Son. More particularly, the Graetz converter is generally described with regard to FIG. 1 of page 72 and FIG. 3 of page 132 of the Kimbark text.

FIG. 3 of page 132 of the Kimbark text shows the Graetz converter changing the D.C. voltage polarity but maintaining unchanged D.C. current $I_d$ polarity when it is controlled from the state of rectifying to the state of inverting. As stated by Kimbark on page 105 of his text with respect to the Graetz converter, "because the valves conduct in only one direction, the current in a converter cannot be reversed, and power reversal can be obtained only by the reversal of the average direct voltage $V_d$". This characteristic is disadvantageous if more than two converters are involved with a common D.C. system.

For example, with a plurality of more than two converters interconnected to a common D.C. system, each should be controllable to invert or to rectify with respect to that common D.C. system without interfering with the controlled state of inverting or rectifying of the other interconnected converters. However, if more than two Graetz converters are involved, appropriate switching of the converter busses to the D.C. system must be provided to allow the multiple converters to each perform the desired inverting or rectifying function. The switching operation implies either a partial or complete shutdown of the system and thus a disruption of the power flow. The switching is expensive; the switching operation is complicated; and the power flow disruption is highly undesirable. It is considered desirable that converters be provided for three or more terminal operations related to a common D.C. system having the proper flow of current so as to allow each of the multiple converters to perform its desired inverting or rectifying operation without causing a disruption of the power flow.

Accordingly, objects of the present invention are (1) to provide a converter circuit that performs an interchangeable inverting or rectifying operation without requiring or causing a disruption of the system power flow, even in a system including three or more converters, and (2) to provide a converter circuit that develops an A.C. current waveform that is nearly sinusoidal and that is restricted in its harmonic components.

Another object is to provide a converter that reverses the direction of D.C. system current flow through the converter when the operating mode of the converter is changed between inversion and rectification and which is capable of operating with a relatively high power factor when operating near full inversion or full rectification.

Still another object is to provide a converter capable of smoothly reversing the direction of the power flow between a D.C. system and an A.C. system and capable of smoothly adjusting the magnitude of such power flow between zero and a maximum value.

These and other objects of the present invention will become apparent to those skilled in the art upon consideration of the following description of the invention.

SUMMARY OF THE INVENTION

In carrying out my invention in one form, I provide a line-commutated resonant pulse converter circuit having (i) a pair of D.C. terminals adapted to be connected to a D.C. system and (ii) a pair of A.C. terminals adapted to be connected to an A.C. system. The converter circuit further comprises first, second, third, and fourth branches, each branch comprising the combination of a thyristor and diode connected in inverse-parallel relationship and an inductor connected in series with the thyristor-diode combination.

Means are provided for connecting the first and fourth branches in series across said D.C. terminals, with a first node located between said first and fourth branches; and means is provided for connecting the second and third branches in series across said D.C. terminals, with a second node located between said second and third branches. The diodes of the four branches are connected in a blocking direction with respect to said D.C. terminals. A transformer comprising two windings magnetically coupled together has means for connecting one of said windings between said nodes and means for connecting the other of said windings across said A.C. terminals.

The converter circuit further comprises gating means (i) for triggering the thyristors of said first and second branches into conduction substantially simultaneously to provide a conductive path between said D.C. terminals that extends through said first and second branches via said one winding and (ii) for triggering the thyristors of said third and fourth branches into conduction substantially simultaneously to provide a conductive path between said D.C. terminals that extends through said third and fourth branches via said one winding. Means is provided for controlling the gating means such that the thyristors of the first and second branches are triggered into conduction at a controllable phase angle with respect to the A.C. system voltage and such that the thyristors of the third and fourth branches are triggered into conduction approximately 180 degrees of the A.C. system voltage thereafter. This triggering action is normally repeated for each cycle of the A.C. system voltage. The means for controlling the gating means is adjustable over a range that provides for smooth adjustment through zero of the magnitude of the power flow between said A.C. and D.C. systems and for smooth reversal in the direction of said power flow between said A.C. and D.C. systems.

The features of the invention believed to be novel are set forth with particularlity in the appended claims. The invention, itself, however, both as to its organization and method of operation, together with further objects and advantages thereof, may best be understood by reference to the following description taken in conjunction with the accompanying drawings.

BRIEF DESCRIPTION OF THE DRAWINGS

FIGS. 7a–7f show the Flow-Chart of the computer program of Appendix A related to the present invention.

FIG. 8 shows the waveforms of the circuit arrangement of FIG. 6.

FIGS. 9a and 9b show respectively the A.C. current $i_o$ of the circuit of FIG. 4 and the A.C. current $i_o$ of the circuit of FIG. 4 less its zero sequence harmonic components.

DETAILED DESCRIPTION OF THE INVENTION

Figure 1:
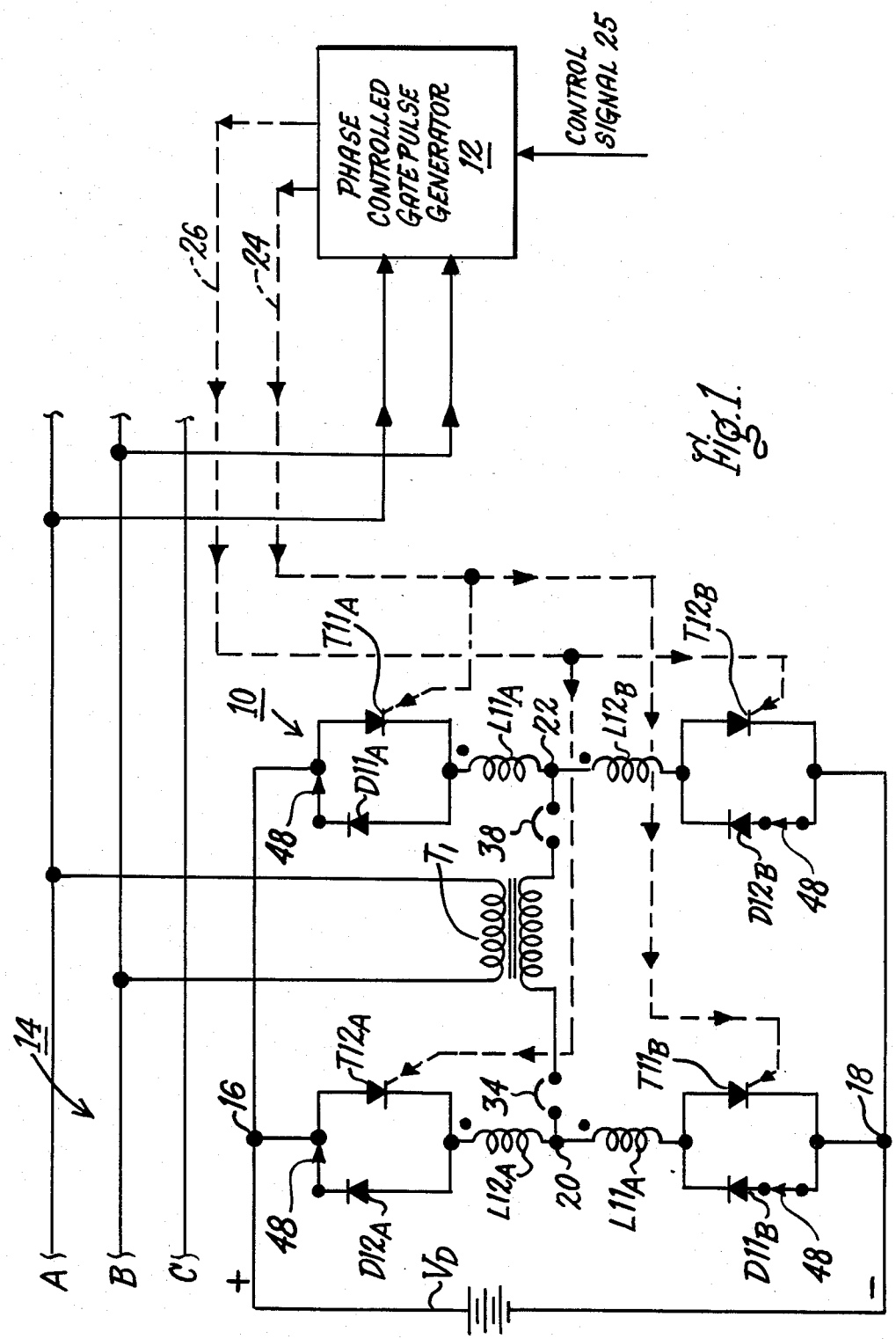
FIG. 1 is a circuit arrangement of one embodiment of the present invention.

Embodiment of FIG. 1

FIG. 1 shows one embodiment of the present invention and, more particularly, a line-commutated resonant pulse converter circuit 10 which is coupled between two phases (A and B) of a transmission line 14. Other embodiments of the present invention will be described hereinafter for coupling to all three-phases of the transmission line 14.

As will be described hereinafter, the line-commutated resonant pulse converter circuit 10 provides the means for coupling between the A.C. power of the transmission line 14 and a D.C. power system shown in FIG. 1 as a D.C. battery $V_D$. The circuit 10 of FIG. 1 performs both an inverting and rectifying function. The terms "inverting" and "rectifying" are well known in the power conversion art. "Inverting" is meant to represent that the power flow is from the direct (D.C.) form to an alternating (A.C.) form. "Rectifying" is meant to represent that the power flow is from the A.C. form to the D.C. form. The term "converter" is also well known in the art of power conversion and is commonly used to signify a device that may operate as either a rectifier or an inverter.

For the sake of clarity the term "Converter" is to be used hereinafter to describe my invention.

FIG. 1 shows the circuit arrangement 10 as having four branches, each branch comprising a thyristor, a diode, and an inductor. The first branch comprises a diode $D11_A$ and a thyristor $T11_A$ connected in inverse-parallel relationship and an inductor $L11_A$ connected in series with the inverse-parallel combination of $D11_A$ and $T11_A$. The third branch comprises a diode $D12_A$ and a thyristor $T12_A$ connected in inverse-parallel relationship and an inductor $L12_A$ connected in series with this inverse-parallel combination. The second branch comprises the inverse-parallel combination of diode $D11_B$ and thyristor $T11_B$ and inductor $L11_B$ connected in series with this inverse-parallel combination. The fourth branch comprises the inverse-parallel combination of diode $D12_B$ and thyristor $T12_B$ and the inductor $L12_B$ connected in series with this inverse-parallel combination. The four branches are arranged in FIG. 1 as the arms of a bridge converter circuit. It should be noted that the first and third branches are connected to the positive D.C. terminal, and the second and fourth branches are connected to the negative D.C. terminal of the converter. It should be further noted that the diodes of all four branches are connected in a blocking direction with respect to the D.C. terminals.

The four branches are shown in FIG. 1 as having an upper node 16, a lower node 18, and two central nodes 20 and 22. The upper node 16 is connected to a positive terminal of the D.C. system $V_D$. The lower node 18 is connected to a negative terminal of the D.C. system $V_D$. The central nodes 20 and 22 are connected to opposite terminals of the secondary winding of a transformer $T_1$. The transformer $T_1$ has a primary winding coupled across phases A and B of transmission line 14.

FIG. 1 further shows a control line 24 connected to the gate electrodes of thyristors $T11_A$ and $T11_B$. Still further, FIG. 1 shows a second control line 26 connected to the gate electrodes of thyristors $T12_A$ and $T12_B$. The signals present on control lines 24 and 26 are generated by a Phase-Controlled Gate Pulse Generator 12. The Phase-Controlled Gate Pulse Generator 12 receives a signal representing the voltage between phases A and B of the transmission line 14, and also receives a control signal.

The Phase-Controlled Gate Pulse Generator 12 substantially simultaneously triggers thyristors $T_{12A}$ and $T_{12B}$ into conduction with a pulse applied via control line 26 and substantially simultaneously triggers thyristors $T_{11A}$ and $T_{11B}$ into conduction with a pulse applied via control line 24. The control signal 25 to generator 12 causes the generator to trigger thyristors $T_{12A}$ and $T_{12B}$ into conduction at a controllable phase angle $\phi$ with respect to the A.C. system voltage and to trigger thyristors $T_{11A}$ and $T_{11B}$ into conduction 180° of A.C. system voltage thereafter.

In accordance with the control signal 25, the generator 12 adjusts the above-described phase angle $\phi$, exerting what is sometimes referred to as phase-angle control. The generator 12 may be of a conventional type commonly used in the art of power conversion. As an example, reference may be had to U.S. Pat. No.

3,863,134-Pollard, assigned to the assignee of the present invention.

The converter circuit arrangement 10 performs either an inverting or rectifying function. The functional operation of the circuit arrangement is determined by the above-described phase angle, or angle of gating, $\phi$. The desired range for the angle of gating is of primary importance to my inventive concept. In order that the desired range for the circuit arrangement 10 of FIG. 1 and my alternate embodiments of FIGS. 4, 10, 11, and 12 be described, reference is made to: (1) FIG. 6 which is a schematic diagram of the circuit arrangement 10 of FIG. 1 from which a computer analysis may be derived, (2) FIGS. 7a-7f showing a Flow-Chart for the computer analysis of the schematic diagram of FIG. 6, (3) Appendix A showing an exemplary computer listing for the computer analysis performed for the schematic diagram of FIG. 6, (4) Table 2 showing results for the desired inverting mode adjustment of the angle of gating ($\phi$) as the ratio of peak A.C. to D.C. voltage is varied from 1.85 to 5.0 for the case that the A.C. system inductance is trivial (C=1), (5) Table 3 showing the results from the effect of adjusting the angle of gating ($\phi$) over the desired range for exerting adjustment of the power flow from maximum inversion to maximum rectification with the ratio of peak A.C. to D.C. voltage equaling 2.25 and with trivial A.C. system inductance (C=1), (6) Appendices B and C showing computer runs accomplished with the Computer Program of Appendix A.

Figure 6:
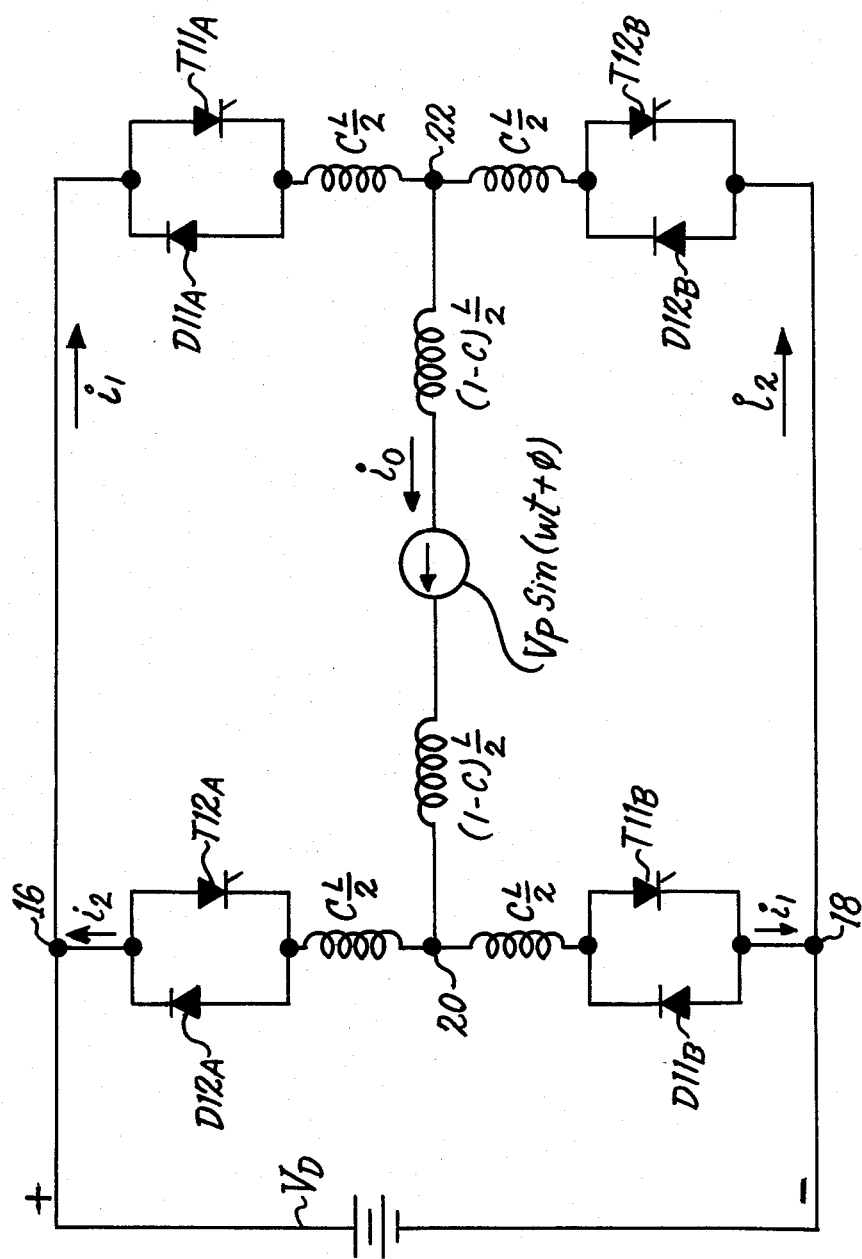
FIG. 6 is a schematic diagram of FIG. 1.

The source equations of the computer analysis of Appendix A relate to the circuit arrangement 10 of FIGS. 1 and 6 and the Tables 2 and 3 involve a multiplicity of symbols. The symbols of Tables 2 and 3 are related to two cases: Case A and Case B.

Case A is concerned with the condition when diodes $D11_A$ and $D11_B$ are conducting at $\omega t = \pi$.

Case B is concerned with the condition when thyristors $T11_A$ and $T11_B$ are conducting at $\omega t = \pi$.

For the Case A condition there is a current zero prior to $\omega t = \pi$ involved as the current $i_1$ transfers from $T11_A$ and $T11_B$ to their respective diodes $D11_A$ and $D11_B$. The angle of current $i_1$ transfer between thyristors $T11_A$ and $T11_B$ and diodes $D11_A$ and $D11_B$ is termed ($\mu + \sigma$). A necessary restraint on the validity of Case A is:

$$\mu + \sigma \leq \pi.$$

For the Case B there will be two current zeros involved with current $i_2$ of FIG. 6. One of the zero currents is the second zero current representing the extinction of current $i_2$ which occurs at $\omega t = \mu$. The first zero of $i_2$ related to Case B represents current transfer from thyristors $T12_A$ and $T12_B$ to their respective diodes $D12_A$ and $D12_B$. The first current zero is unique to Case B and is designated in Table 1 as $\mu B$. Reference is now made to Table 1.

Table 1 provides general definitions for a majority of the symbols used in Appendix A and Tables 2 and 3. The normalized voltages are the actual voltages divided by the D.C. system voltage $V_D$. The normalized currents are the actual currents times the reactance ($\omega L$) and divided by the D.C. system voltage $V_D$. Reference characters used in the definitions are shown in FIG. 6.

TABLE 1

| Terms | General Definition |
|---|---|
| $\omega$ | angular frequency of the A.C. system. |
| L | total inductance of a complete conductive path through the converter extending through the D.C. system, e.g., a path extending from node 16 through valve $D11_A$-$T11_A$, through inductor $C\frac{L}{2}$ to node 22, then through inductor $(1-C)\frac{L}{2}$, through the A.C. system $V_p \sin(\omega t + \phi)$ and through inductor $(1-C)\frac{L}{2}$ to node 20, then through inductor $C\frac{L}{2}$ and through valve $D11_B$-$T11_B$ to node 18, then back through the D.C. system $V_D$ to node 16. |
| C | ratio of the inductance of the branches of the converter in a conductive path to the total conductive path inductance. (program input) |
| $\overline{V}$ or VBAR or VB | normalized peak value of the A.C. system voltage $V_p$ coupled between nodes 20 and 22. (program input) |
| $\emptyset$ or PH | angle with respect to A.C. system voltage at which thyristors $T11_A$ and $T11_B$ are gated. (program input to be in degrees) |
| $\mu$ or U | overlap angle of conduction at all four bridge valves $D11_A$-$T11_A$ conducting $D12_A$-$T12_A$ conducting $D11_B$-$T11_B$ conducting $D12_B$-$T12_B$ conducting |
| $\mu$ B or UB | overlap angle of conduction of the thyristors of all four bridge valves $T11_A$ conducting $T12_A$ conducting $T11_B$ conducting $T12_B$ conducting |
| $\sigma$ or SIG | angle of conduction of a thyristor after completion of the overlap angle $\mu$ or U. For Case A only. |
| TTA | angle of inverse thyristor voltage following conduction of that thyristor. (program output is in degrees) |
| $\omega$ t | product of angular A.C. system frequency times time. (program output is in degrees) |
| D $\omega$ T (DEG) | angular increment for program evaluation of: A1, A2, AO, VT. (program input to be in degrees) |
| PFI | fundamental frequency power factor. |
| $\overline{VT}$ or VT | normalized forward voltage of thyristors $T12_A$ and $T12_B$. Inverse thyristor voltage due to diode conduction is not evaluated amplitude wise. (program output) |
| $\overline{A1}$ or A1 | normalized current $i_1$. (program output) |

TABLE 1-continued

| Terms | General Definition |
|---|---|
| $\overline{A2}$ or A2 | normalized current $i_2$. (program output) |
| $\overline{AO}$ or AO | normalized A.C. current $i_o$. (program output) |
| $\overline{AO1R}$ or AO1R | normalized real fundamental r.m.s. component of current $i_o$. (program output) |
| $\overline{AO1J}$ or AO1J | normalized reactive fundamental r.m.s. component of current $i_o$. (program output) |
| $\overline{AHN}$ or AHN | normalized Nth harmonic r.m.s. component of current $i_o$. (program output for N = 3, 5, 7, 9, 11, 13, 15) |
| $\sum_{N=3}^{N=9}$ AION | normalized vector sum of the 3rd, 5th, 7th, and 9th harmonic r.m.s. components of $i_o$. |
| $\sum_{N=5}^{N=7}$ AION | normalized vector sum of the 5th and 7th harmonic r.m.s. components of $i_o$. |
| $\overline{AN}$ or AN | component of $\overline{AHN}$. |
| $\overline{BN}$ or BN | another component of $\overline{AHN}$. |
| $\overline{AO1}$ or AO1 | normalized fundamental r.m.s. component of current $i_o$. |
| $\overline{AO1A}$ or AO1A | component of $\overline{AO1}$. |
| $\overline{AO1B}$ or AO1B | another component of $\overline{AO1}$. |
| $\overline{AA}$ or AA | normalized average value of current $i_1$. |
| $\overline{A20}$ or A20 | normalized value of current $i_2$ at the time of gating thyristors T11$_A$ and T11$_B$. |
| $\overline{AU}$ or AU or Au | normalized value of current $i_1$ at the instant D12$_B$ stops conducting. |

Table 1 Addendum

Figure 10:
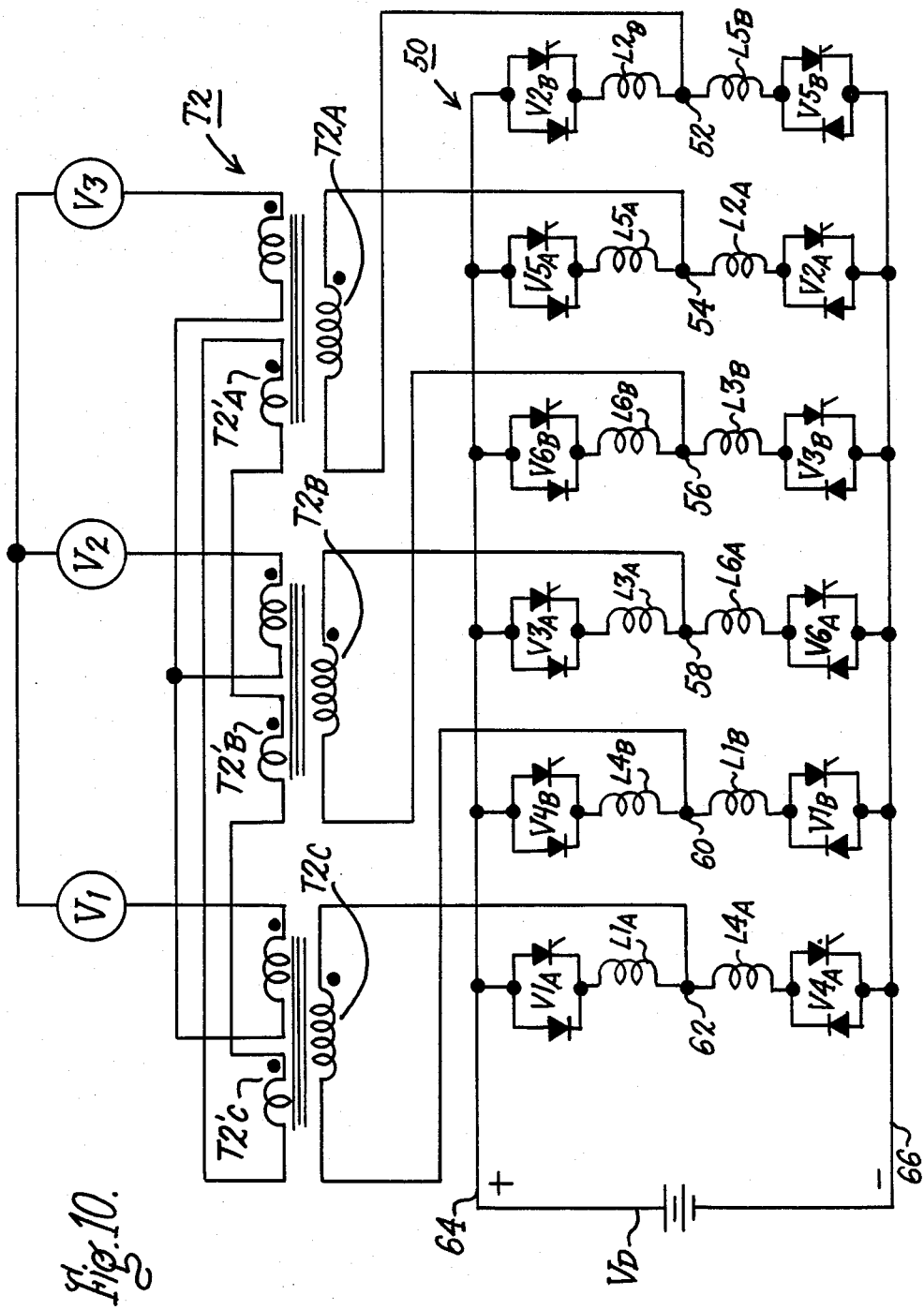
FIG. 10 shows another alternate embodiment of the present invention for coupling a three-phase A.C. system and a D.C. system.

For polyphase arrangements such as that of FIG. 10 involving four branches per phase of the A.C. system, treatment of the symbols and equations is the same as for the FIG. 6.

Figure 4:
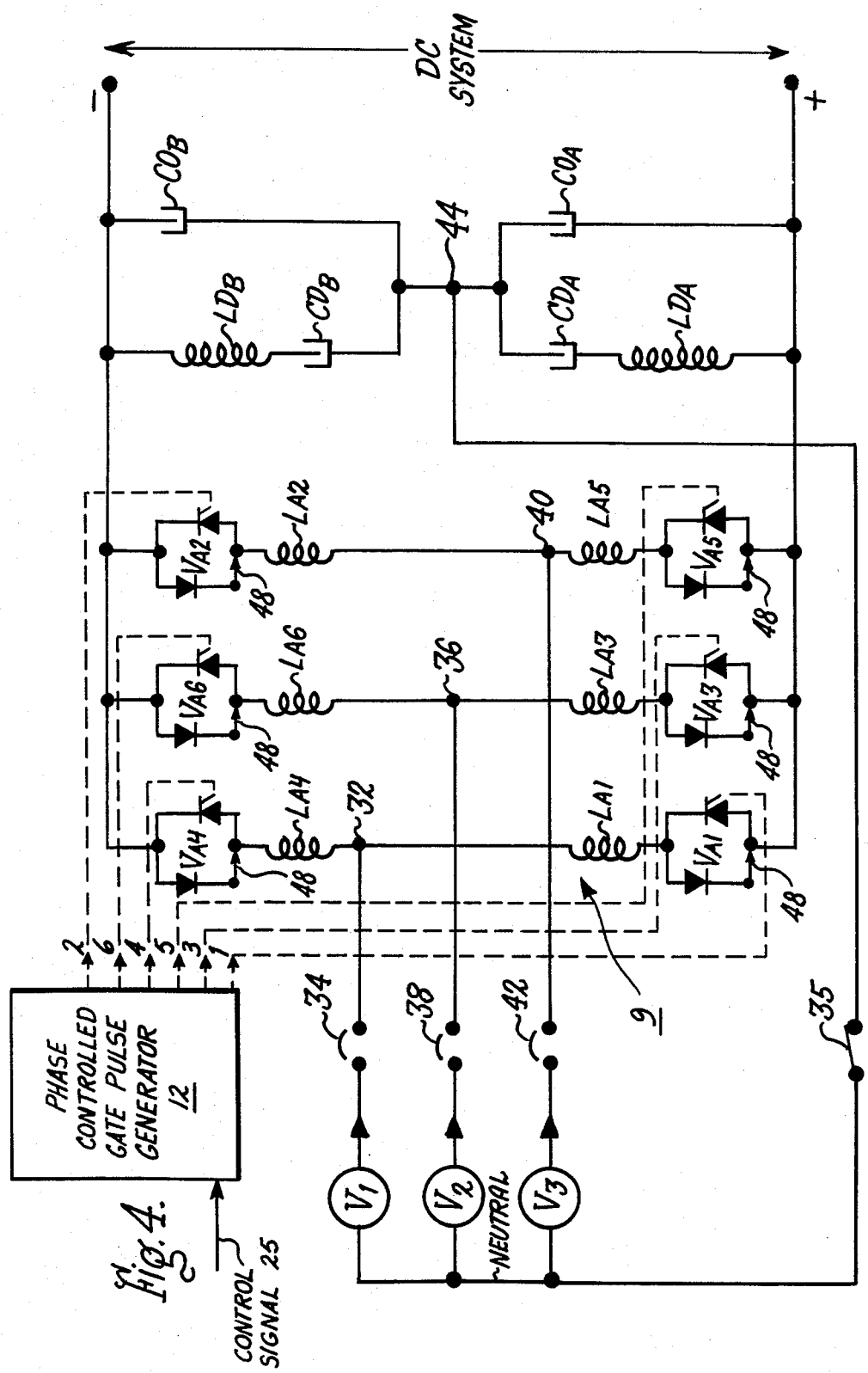
FIG. 4 is a circuit arrangement of another embodiment of the present invention for coupling a three-phase A.C. system with a D.C. system.
Figure 11:
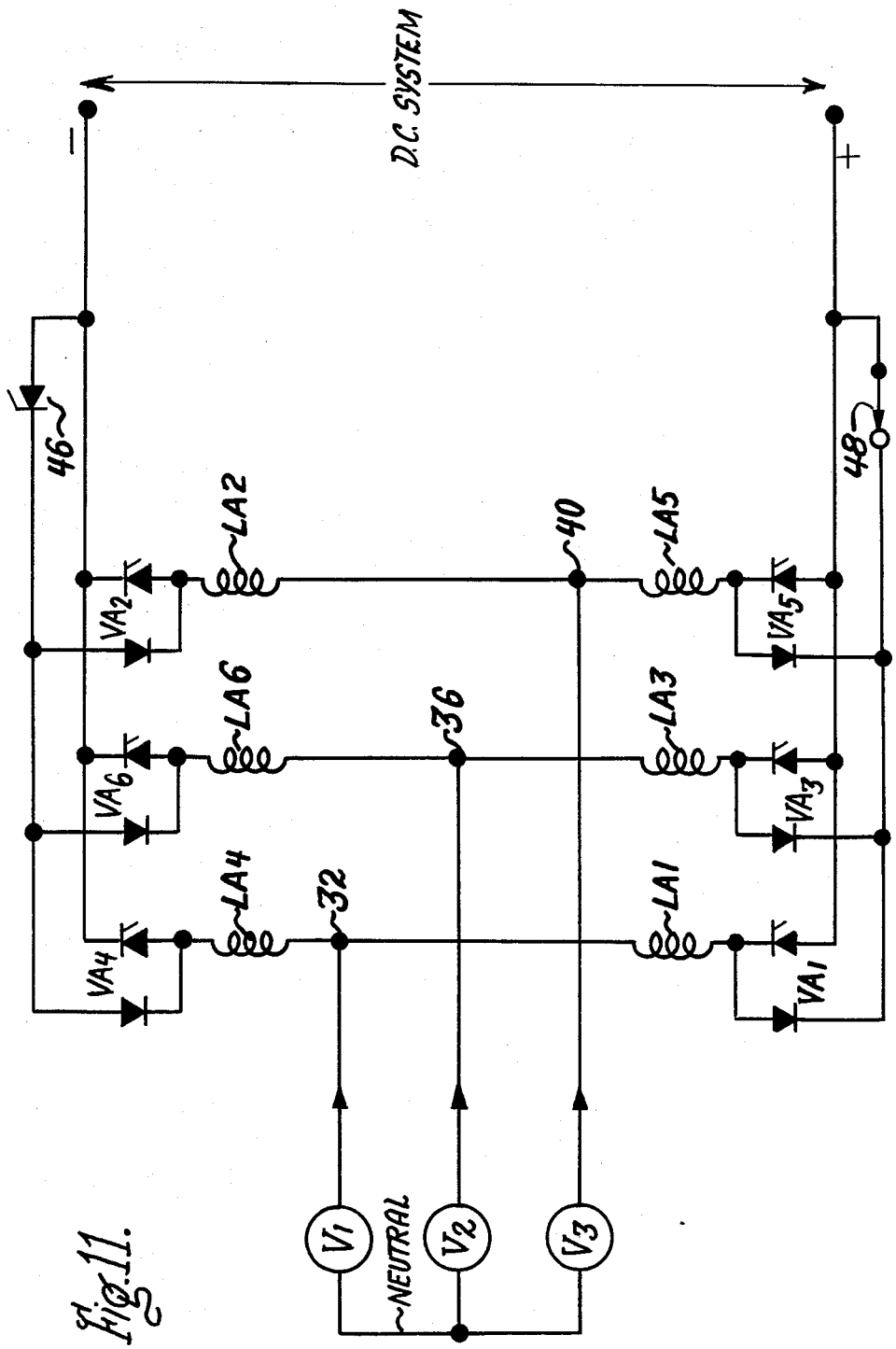
FIG. 11 shows a still further embodiment of the present invention for coupling a three phase A.C. system and a D.C. system.
Figure 12:
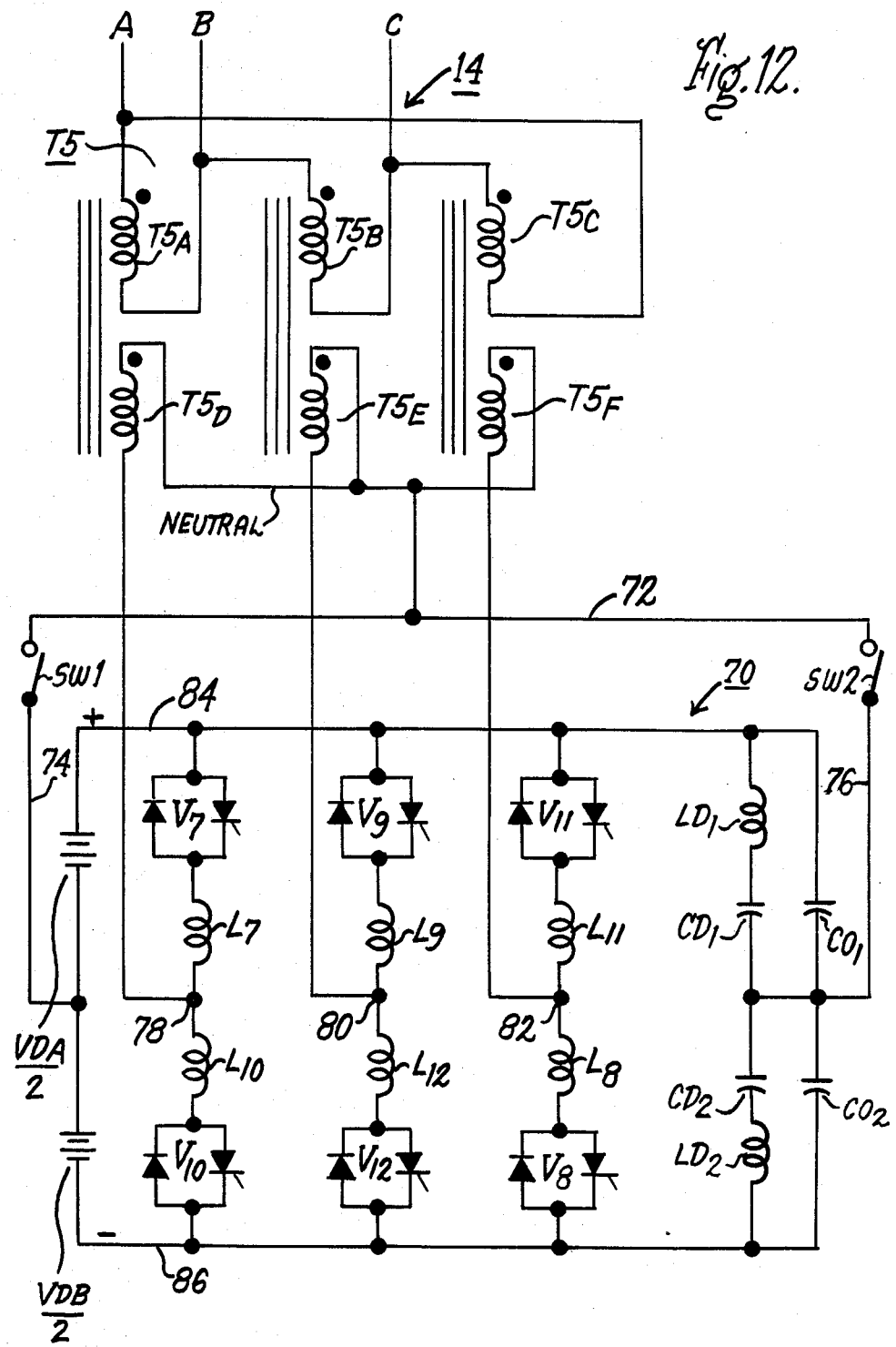
FIG. 12 still further shows another alternate embodiment of the present invention for transmission line applications.

For polyphase arrangements such as those of FIGS. 4, 11 and 12 there are two branches per phase of the A.C. system. For this case the line to neutral voltage is regarded as the A.C. system voltage while half of the actual D.C. system voltage is regarded as the D.C. system voltage. The total inductance L is the inductance associated with one branch plus the inductance associated with the line to neutral phase of the A.C. system. The ratio C is the ratio of the branch inductance to the total inductance.

Figure 2:
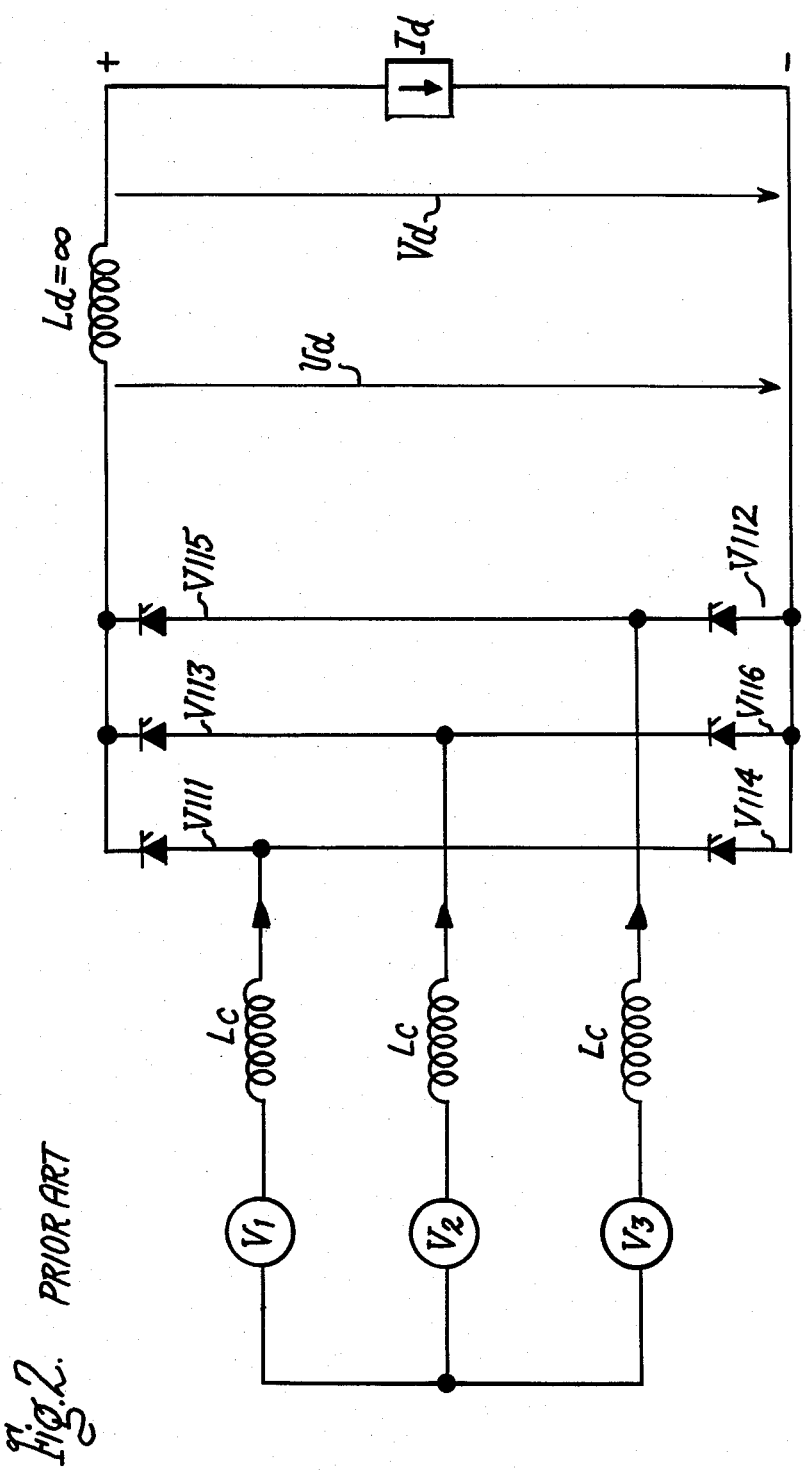
FIG. 2 is a diagram of a prior art Graetz Converter.

The Prior Art Graetz Converter of FIG. 2

In order that the desired operation of my circuit arrangement 10 of FIG. 1 may be more fully appreciated, reference is first made to a general discussion of the prior art Graetz Converter shown generally in FIG. 2.

FIG. 2 is similar to the FIG. 1 of the Bridge Converter shown in FIG. 1 on page 72, Vol. 1 of the above-cited text DIRECT CURRENT TRANSMISSION by E. W. Kimbark. The circuit arrangement in Kimbark's FIG. 1 is commonly referred to as a Graetz converter, and reference may be made to his text for a detailed discussion of this Graetz converter.

In my FIG. 2, I have increased the value of the reference numbers of the thyristors $V_1$ through $V_6$ of the DIRECT CURRENT TRANSMISSION text by a factor of 110 and have maintained the nomenclature of the shown inductors $L_C$ and $L_d$, voltages $v_d$ and $V_d$, and current $I_d$. Furthermore, FIG. 2 has added the symbols $V_1$, $V_2$ and $V_3$ to show typical phase related quantities of an A.C. Source. Although not shown, it is to be understood that the usual transformer is typically coupled between the A.C. voltage sources $V_1$, $V_2$, $V_3$ and the converter.

With regard to FIG. 2, the thyristors V111-V116 of the Graetz arrangement and their capability for reversing D.C. Terminal Voltage allow this circuit to operate as either a rectifier or as an inverter. Such an arrangement is generally called a converter. Adjustment of the angle of gating of the valves V111 . . . V116 with respect to their phase relationships to the A.C. System Voltages engenders control. Advancing the respective gating angles increases the value of the quantity $V_d$ of FIG. 2, and conversely, retarding the gating angles decreases $V_d$ of FIG. 2. $V_d$ may be increased to a maximum value at "full advance gating", and may be made a relatively high negative value with "very retarded gating". There are limitations on the amount of gate angle retarding that may be accomplished. This limitation is due to the effect of retarding the gating on the "margin angle" or in substance "turn-off time", that is, the interval of inverse-voltage on the thyristor prior to reapplication of forward-voltage. As the gating angles are increasingly retarded, the "margin angle" is decreased until the "margin angle" approaches a limit that is the minimum "turn-off time" required by the thyristor valve plus a suitable safety factor.

In substance, the Graetz converter of FIG. 2 may rectify (with relatively small values of gating angle retard) and deliver power from the A.C. system to the D.C. system or load. It may also invert (with relatively large values of gating angle retard) and deliver power from the D.C. system to the A.C. system.

Figure 3:
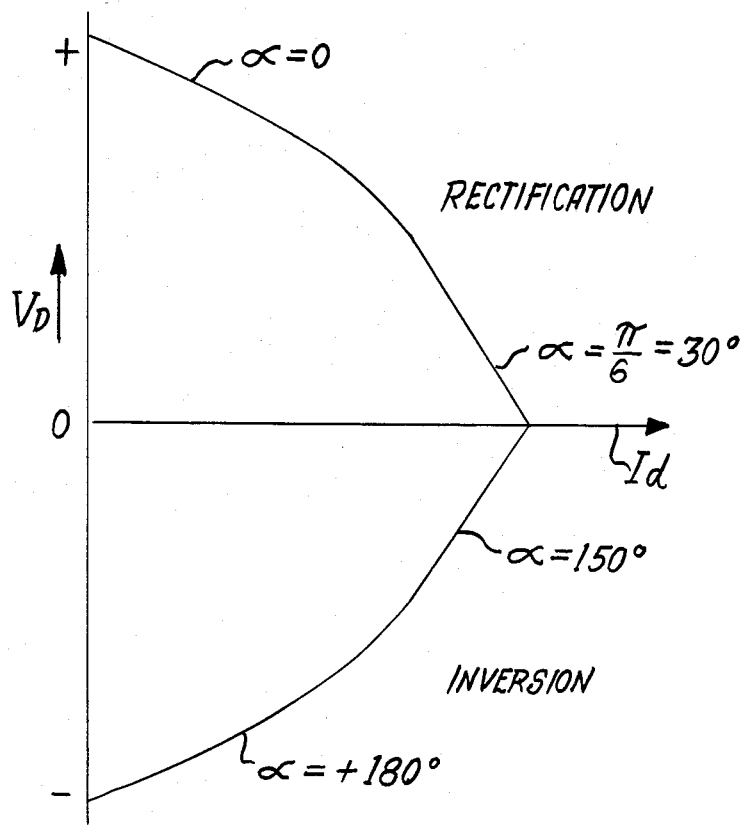
FIG. 3 is a diagram of one characteristic of the circuit of FIG. 2.

The Graetz converter of FIG. 2 may gate valve V111 fully advanced if the valve V111 is gated at the instant the $V_1-V_3$ becomes slightly greater than zero. The gating angle ($\alpha_1$) for valve V111 may be measured from this instant. At full advance $\alpha_1=0$. For this case, maximum $V_d$ or maximum rectification may occur. The $\alpha_1$ may be retarded such that the $V_d$ approaches zero for zero power flow at or near $\alpha_1$ of approximately 90° (retard). Considering a realistic overlap angle of 15 degrees for valves V111 . . . V116 and a realistic margin angle of about 15° for valves V111 . . . V116, the $\alpha_1$ may be retarded for maximum inversion to about (180°—overlap—margin angle) which has a typical value of 150°. In steady-state operation the valves V111 . . . V116 may be gated in the designated firing order, that is, V111, V112, V113, V114, V115 and V116, with 60 degree intervals between gating events. For $\alpha_1$ of approximately 150° the maximum inversion and maximum negative value at $V_d$ may occur. The three phase double-way Graetz converter characteristic (assuming smooth D.C. current) is illustrated in FIG. 3 on Page 132 of the reference Kimbark text and a simplified drawing of that FIG. 3 of the Kimbark text is shown in my FIG. 3, to which reference is now made. My FIG. 3 highlights that of FIG. 3 of Kimbark so that the operation of the Graetz Converter may be compared hereinafter to my improved converter. The term $\alpha$ as used in connection with the Graetz converter corresponds to the term $\phi$ as used in connection with my converters.

Figure 13:
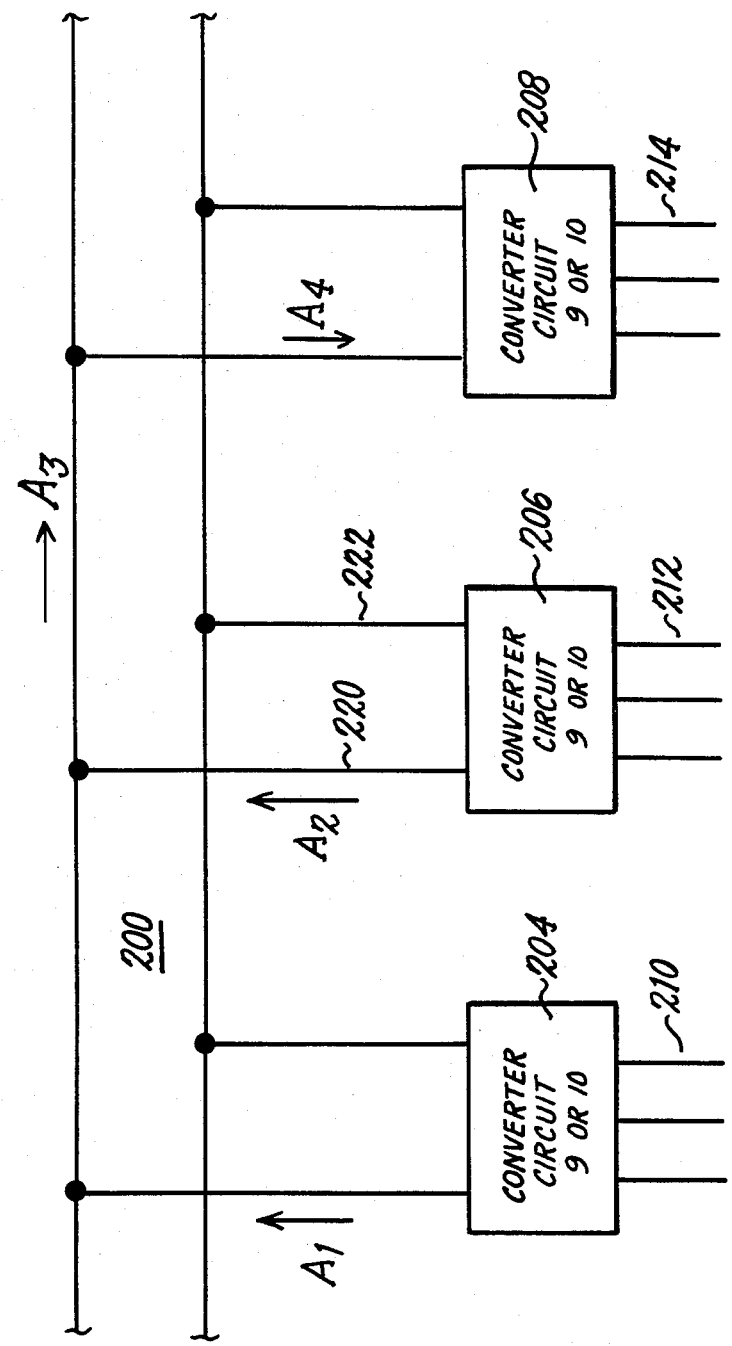
FIG. 13 generally shows arrangement of the present invention for a multi-terminal high-voltage d.c. (HVDC) system application.

From FIG. 3 it is seen that the Graetz Converter reverses the polarity of the D.C. voltage but maintains unchanged the polarity of the D.C. current $I_d$ when it is controlled from the state of rectifying to the state of inverting. As discussed in the "Background" Section, this characteristic inhibits freedom of control if more than two Converter Terminals are involved with a common D.C. System. My line-commutated resonant pulse converter operates as a rectifier or as an inverter with a constant voltage polarity D.C. system thus allowing several converters to be connected to a common D.C. system with freedom to exert control such that an individual converter can either rectify or invert. This property lends itself for example to the capability of employing several Converter Terminals associated with several A.C. systems with a Common D.C. System such as for example a D.C. Transmission System. Such a System involving three Converter Terminals is generally illustrated by FIG. 13, which is described in more detail hereinafter.

The Embodiment of FIG. 4

The Graetz Converter of FIG. 2 is shown for a three-phase voltage application. In order that the Graetz Converter may be compared to my invention, reference is now made to my FIG. 4 showing a three-phase line-commutated resonant pulse converter 9. FIG. 4 has a similar arrangement to that shown and described for the circuit 10 of FIG. 1. FIG. 4 shows six branches, each comprising the combination of a thyristor and a diode connected in inverse-parallel relationship and an inductor connected in series with the combination. These branches correspond to similar branches in FIG. 1. The thyristor-diode combinations may be referred to as valves, and these valves are designated $V_{A1}$ through $V_{A6}$. The inductor associated with each valve is designated L and assigned the same subscript as its associated valve.

Valves $V_{A1}$, $V_{A3}$ and $V_{A5}$ each have one terminal connected to the positive D.C. terminal of the converter, and valves $V_{A4}$, $V_{A6}$ and $V_{A2}$ each have one terminal connected to the negative D.C. terminal of the converter. The branches containing valves $V_{A1}$ and $V_{A4}$ are connected in series across the D.C. terminals, with a node 32 located between the two branches. The branches containing valves $V_{A3}$ and $V_{A6}$ are connected in series across the D.C. terminals, with a node 36 located between these two branches. The remaining two branches (containing valves $V_{A5}$ and $V_{A2}$) are connected in series across the D.C. terminals, with the node 40 located between them. The diodes of all branches are connected in a blocking direction with respect to the D.C. terminals.

Junctions 32, 36, and 40 are respectively coupled to voltage sources $V_1$, $V_2$, $V_3$ (also shown for the Graetz Converter of FIG. 2) via switches 34, 38 and 42 respectively. Although not shown in FIG. 4, it is to be understood that the usual transformer is typically coupled between the A.C. voltage sources $V_1$, $V_2$, and $V_3$ and the converter. At one of their sides the voltage sources $V_1$, $V_2$, and $V_3$ are connected together by a neutral conductor which is coupled via switch 35 to junction 44 located on the output stage of my Converter of FIG. 4. Operation with switch 35 open suppresses the circulation of zero sequence harmonics and does not require a D.C. system midpoint 44 or the means for establishing the midpoint such as $CD_A$, $CD_B$, $CO_A$, $CO_B$, $LD_A$ and $LD_B$ and $L_{DB}$. Operation with switch 35 closed allows free circulation of the zero sequence harmonics. The case of the switch 35 closed will be considered now since evaluation of this case will demonstrate only a trivial change in operation for the switch open or switch closed operation.

Junction 44 is formed by one end of each of four capacitors $CD_A$, $CD_B$, $CO_A$, and $CO_B$. Each of the two capacitors $CD_A$ and $CD_B$ have each of their other end connected to the one end of each inductor $LD_A$ and $LD_B$ respectively. The other end of each of the inductors $LD_A$ and $LD_B$ is connected to opposite terminals + and −, respectively, of the D.C. System. Each of the two capacitors $CO_A$ and $CO_B$ have their other ends coupled to opposite terminals + and −, respectively, of the D.C. System of FIG. 4.

In FIG. 4 the thyristors of the valves $V_{A1}$ through $V_{A6}$ have their gates connected to the terminals of a phase-controlled gate-pulse generator, which is of a conventional type such as shown in the above-mentioned U.S. Pat. No. 3,863,134-Pollard. These terminals are assigned reference numbers corresponding to the thyristors controlled. The gate pulse generator 12 triggers or gates the thyristors into conduction in the numbered order. A control signal 25 normally causes the generator 12 to trigger the thyristors into conduction at a controllable phase angle $\phi$ with respect to the A.C. system voltage and with 60 degree intervals between gating events, as in the aforesaid Pollard patent.

Comparison between Converters of FIG. 2 and FIG. 4

A comparison may now be made between my Converter of FIG. 4 and the Graetz Converter of FIG. 2. Such a comparison reveals the following differences: (1) my converter involves the addition of inverse connected diodes across the phase controllable thyristors (shown as $V_{A1}$ ... $V_{A6}$); (2) my Converter involves the employment of inductors in series with each controlled thyristor inverse-connected diode combination; (3) unlike the Graetz converter of FIG. 2, my converter does not require inductance in the A.C. lines connected to the converter bridge but may operate with inductance in thos A.C. lines if desired; (4) my Converter of FIG. 4 establishes by use of the $LD_A$, $CB_A$, $LD_B$, $CD_B$, $CO_A$ and $CO_B$ components, a mid point at the D.C. System for bypassing the zero sequence harmonic components of the A.C. currents; (5) my Converter of FIG. 4 does not require a D.C. inductor, such as $L_d$ of FIG. 2, to establish smooth D.C. current, rather a relatively low impedance DC System being more desirable for my Converter of FIG. 4; and (6) my converter illustrates disconnect means (34, 38 and 42) as a 3 pole-switch in the AC lines to prevent rectification if the controlled thyristors of the valves ($V_{A1}$ ... $V_{A6}$) are not gated, but, as is to be further discussed, other disconnect means may be provided by techniques other than the switches 34, 38, and 42 of FIG. 4. FIG. 1 shows corresponding disconnect switches at 34 and 38.

The neutral of the voltage sources $V_1$, $V_2$ and $V_3$ is illustrated in FIG. 4 as being connected to a divider across the DC system, formed of LC series combinations of $LD_A$ and $CD_A$, and of $LD_B$ and $CD_B$ in parallel with capacitors $CO_A$ and $CO_B$, respectively. It is the purpose of this divider $LD_A \ldots CO_B$ to provide a low impedance path for the zero sequence harmonic currents, i.e., 3rd, 9th, 15th, etc. harmonic currents. One embodiment of my invention (as illustrated) involves a tuned series LC network formed of $LD_A$ and $CD_A$ and $LD_B$ and $CD_B$ tuned to the third (3rd) harmonic frequency so as to provide low impedance to the 3rd harmonic frequency and capacitors $CO_A$ and $CO_B$ which provide a low impedance path to the others 9, 15, 21 . . . harmonic frequencies. Various modifications, to be described, of the divider may also be employed.

Figure 5:
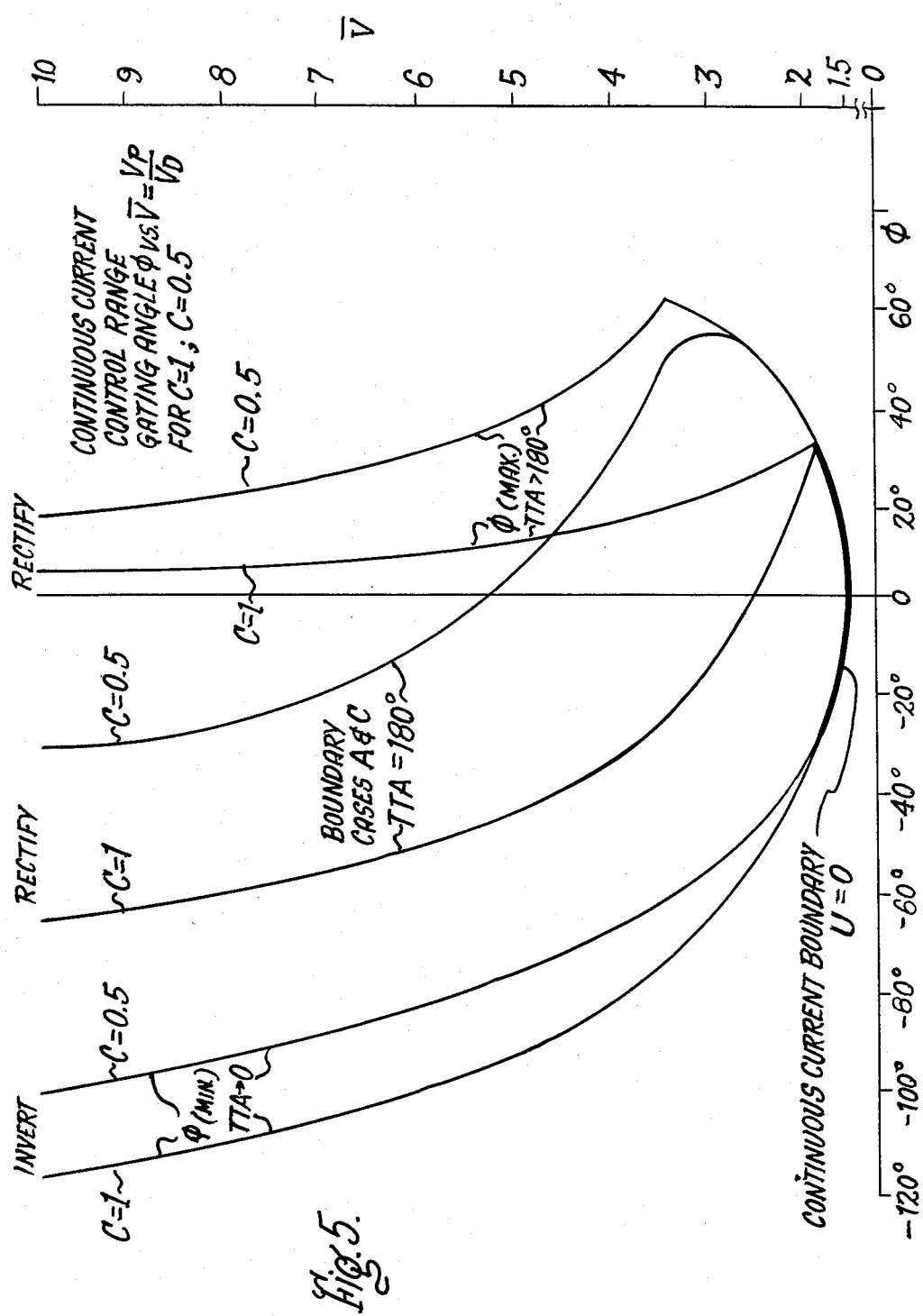
FIG. 5 shows the continuous current control range of the circuit arrangement of FIG. 1.

In general, my line-commutated resonant pulse converter gating control range with continuous current and for C=1 and for C=0.5 is illustrated in the graph of FIG. 5, where the coordinates are the gating angle $\phi$ and $\overline{V}$, which equals $V_P/V_D$. The values C=1 and C=0.05 are to be described hereinafter with regard to FIG. 6. The gating angle ($\phi$) is measured from the instant when phase voltage $V_1$ increases positively through zero. All other gating events are at 60 degree intervals with, for example, $V_{A2}$ being gated 60° later than $V_{A1}$. From FIG. 5 it may be seen that by letting $\overline{V}$=5 and C=0.5, maximum inversion occurs, due to Margin Angle Limitation, at $\phi=-76°$, and maximum rectification occurs at $\phi=+36.87°$. From FIG. 5 it should be noted that retarding the gating angle causes rectification while advancing gating angle increases inversion. This is the opposite of the Graetz Converter control mechanism.

Still further, my line-commutated resonant pulse converter exhibits substantially lower harmonic structure in the wavetrains of the A.C. line currents than typically experienced by the Graetz Converter. This means that substantially less filtering is needed to meet typical Power Utility requirements. In order that the desired operation of my converter and its resulting benefits may be more fully described, reference is now made to FIG. 6.

Discussion of Schematic Diagram of FIG. 6

FIG. 6 is a schematic diagram of the circuit arrangement of FIG. 1, and in the schematic diagram the leakage inductance of transformer $T_1$ of FIG. 1 is included in the term (1−C) L. The term C relates to the uncommon inductance (CL) and is as defined in Table 1. FIG. 6 is similar to FIG. 1 with the exceptions that the transformer and system inductances are lumped into a common inductor (1−C) L and a line to line A-B voltage of transmission line 14 is shown as $V_P \sin(\omega t + \phi)$. FIG. 6 shows the inductors $L11_A$, $L11_B$, $L12_A$ and $L12_B$ of FIG. 1 as each having a value of (C) (L/2). Still further, system inductances and the inductance of the transformer $T_1$ of FIG. 1 are shown in FIG. 6 as having two values each of (1−C) L/2 and each located on opposite sides of the A.C. voltage source. FIG. 6 further shows a current $i_1$ as flowing into the branch comprised of the thyristor $T11_A$ and diode $D11_A$ and into the branch comprised of thyristor $T11_B$ and diode $D11_B$. Still further, FIG. 6 shows the current $i_2$ as flowing into the branch comprised of diode $D12_B$ and thyristor $T12_B$ and into the branch comprised of diode $D12_A$ and thyristor $T12_A$. Further still, FIG. 6 shows the current $i_o$ as flowing into the system voltage $V_p \sin(\omega t + \phi)$.

The currents $i_o$, $i_1$ and $i_2$ plotted against time are shown in FIG. 8, to be described hereinafter. The current $i_o$ is to be referred to hereinafter as the A.C. current. The quantity $i_1 - i_2$ is to be referred to hereinafter as the D.C. system current. The path for the current $i_1$ is primarily provided by the conduction of thyristors $T11_A$ and $T11_B$ or by conduction of diodes $D11_A$ and $D11_B$, whereas, the path for the current $i_2$ is primarily provided by conduction of thyristors $T12_A$ and $T12_B$ or by conduction of diodes $D12_A$ and $D12_B$. The thyristors $T11_A$ and $T11_B$ are both gated by the phase-controlled gate pulse generator 12 at $\omega t=0$ relative to the $V_p \sin(\omega t + \phi)$ source so as to render both $T11_A$ and $T11_B$ conductive at the same time. Similarly, the phase-controlled gate pulse generator 12 gates and renders both thyristors $T12_A$ and $T12_B$ conductive at $\omega t = \pi$ relative to the $V_p \sin(\omega t + \phi)$ source. The phase-controlled gate pulse generator 12 gates the thyristors $T11_A$ and $T11_B$ during the period when the thyristors $T12_A$ and $T12_B$ or diodes $D12_A$ and $D12_B$ are conducting so that there are overlap intervals involving simultaneous conduction of all bridge arms. This simultaneous conduction engenders continuous A.C. current ($i_o$) and relatively low harmonic structure in the A.C. current ($i_o$) wavetrain to be described hereinafter with regard to FIG. 8.

The overlap angle of conduction between the upper valves ($D11_A$ or $T11_A$) and ($D12_A$ or $T12_A$) and the lower valves ($D12_B$ or $T12_B$) and ($D11_B$ or $T11_B$) is expressed as the quantity $\mu$ as given in Table 1. The equation for determination of the overlap angle $\mu$ as involved with continuous A.C. current is as follows:

$$\mu = C/(2-C)[\overline{V}(\cos\phi + \cos(\phi + \mu)) - \pi] \qquad (1)$$

The non-analytic form of the equation (1) for $\mu$ implies a trial and error numerical search technique for evaluation. Such a technique is accomplished by the appropriate section of the computer program of Appendix A and illustrated by the Flow-Chart of FIGS. 7a–7f.

After evaluating $\mu$, a boundary state normalized quantity $\overline{AU}$ having a general definition given in Table 1 can be determined:

$$\overline{AU} = \frac{\mu}{C} + \frac{\overline{V}}{2-C}[\cos(\phi + \mu) - \cos\phi] \qquad (2)$$

Also another boundary state current $I_{20}$ having a general definition given in Table 1 and further expressed in normalized form $\overline{A20} = X \, I_{20}/V_D$ is $$\overline{A20} = \frac{\mu}{C} + \frac{\overline{V}}{2-C}[\cos\phi - \cos(\phi + \mu)] \qquad (3)$$

The normalized time-plane equations for the currents and for the thyristor voltages of FIG. 6 may be given by expressions 4–11:

$$\overline{A1}(\omega t)_o{}^u = \frac{1}{C}(\omega t) + \frac{\overline{V}}{(2-C)}[-\cos\phi + \cos(\omega t + \phi)] \qquad (4)$$

$$\overline{A2}(\omega t)_o{}^u = \overline{A20} - \frac{1}{C}(\omega t) +$$

$$\frac{\overline{V}}{(2-C)}[-\cos\phi + \cos(\omega t + \phi)] \qquad (5)$$

$$\overline{AO}(\omega t)_o{}^u = \overline{A20} + \frac{2\overline{V}}{(2-C)}[-\cos\phi + \cos(\omega t + \phi)] \qquad (6)$$

-continued $$\overline{VT}(\omega t)_o{}^u = 0 \tag{7}$$

$$\overline{A1}(\omega t - U)_u{}^\pi = \overline{AU} + (\omega t - U) + \tag{8}$$

$$\overline{V}[\cos(\phi + U + (\omega t - U)) - \cos(\phi + U)]$$

$$\overline{A2}(\omega t - U)_u{}^\pi = 0 \tag{9}$$

$$\overline{AO}(\omega t - U)_u{}^\pi = \overline{A1}(\omega t - U)_u{}^\pi \tag{10}$$

$$\overline{VT}(\omega t - U)_u{}^\pi = 1 - \frac{C}{2} + \frac{C\overline{V}}{2}\sin(\phi + U + (\omega t - U)) \tag{11}$$

As is well understood by those versed in the field of thyristor applications, after thyristor conduction ends, an interval of inverse thyristor voltage is essential to allow the thyristor to recover its ability to withstand a reapplied forward voltage. This interval of inverse voltage to the thyristor may be expressed as the angle of its associated inverse diode conduction (TTA) expressed in terms of the angular frequency of the A.C. system. For example, the angle of inverse voltage on thyristor T11$_A$ equals the angle of conduction of diode D11$_A$.

Typically the minimum turn off angle (TTA) for high power thyristors of the type employed with utility applications at 60 hz is about 6 degrees. The steady state minimum turn off angle may be of the order of 12 to 18 degrees allowing for depression of that turn off angle under transient conditions.

For the purpose of determination of the thyristor turn-off angle (TTA), it is first necessary to determine if the thyristors T11$_A$ and T11$_B$ or the diodes D11$_A$ and D11$_B$ are conducting at $\pi$ radians of the A.C. system angular frequency after gating of the thyristors T11$_A$ and T11$_B$. The determination is made by evaluating the equation (8) at $\omega t = \pi$. The evaluation leads to:

Case A (or C): $2\overline{V}\cos\phi - \pi > 0$, diodes conducting
Case B: $2\overline{V}\cos\phi - \pi < 0$, thyristors conducting For Case A a trial and error numerical evaluation of equation (2A) for SIG is required.

$$SIG = -\overline{AU} + \overline{V}[\cos(\phi+u) - \cos(\phi+u+SIG)] \tag{2A}$$

For Case A $TTA = 180(1 - SIG/\pi)$ degrees. If the computer evaluation of SIG approaches zero, a Case C occurs where $TTA > 180$ degrees.

In the event that the trial and error evaluation of SIG→0, the $TTA > 180°$, and therefore its determination is unnecessary and is not provided in the program. However, to proceed with the computer evaluation of other parameters it will be necessary to suppress the computation of SIG. The evaluation of TTA should also be suppressed. For Case B a trial and error numerical evaluation of equation (1B) for $\mu B$ is required.

$$\mu B = C/2 - C[\overline{V}(\cos\phi + \cos(\phi + \mu B)) - \pi] \tag{1B}$$

For Case B: $(TTA) = 180/\pi (\mu - \mu B)$ degrees. Noting the similarity of equations (1) and (1B), the term $\mu B$ represents the overlap of conduction of the thyristors of all bridge arms, while $\mu$ represents the overlap of conduction of all bridge arms. The ($\mu B$) therefore represents the evaluation of the first zero (thyristor current extinguishment) of equation (5). The ($\mu$) represents the evaluation of the second zero (diode current extinguishment) of equation (5).

$$\mu B < -\phi - \sin^{-1}\frac{(2 - C)}{C\overline{V}} < \mu$$

The normalized average leg current ($\overline{AA}$) is the normalized average value of current i$_1$ of FIG. 6 and is given by the following expression (12).

$$\overline{AA} = \frac{\overline{AU}}{2} + \frac{(\pi - U)^2}{4\pi} - \frac{U^2}{2\pi C} - \tag{12}$$

$$\frac{\overline{V}}{2\pi}[(\pi - U)\cos(\phi + U) + \sin(\phi + U) + \sin\phi]$$

The normalized real fundamental r.m.s. A.C. current of FIG. 6 is the normalized real fundamental r.m.s. of i$_o$. The normalized real fundamental r.m.s. A.C. current is given by the following expression (13):

$$\overline{AO1R} = \frac{2\sqrt{2}\ \overline{AA}}{\overline{V}} \tag{13}$$

The normalized fundamental r.m.s. of the A.C. current i$_o$ can be extracted by Fourier Analysis of i$_o$, yielding two normalized components $\overline{AO1A}$ and $\overline{AO1B}$ illustrated by the following expressions (14) and (15):

$$\overline{AO1A} = \frac{2}{\pi}\left[(\overline{A2O} - \overline{AU})\sin U - (1 + \cos U) + \right. \tag{14}$$

$$\overline{V}\left(\frac{1}{2}\cos(\phi + U) - \frac{2}{(2 - C)}\cos\phi\right)\sin U +$$

$$\overline{V}\left(\frac{\pi}{2} + \frac{CU}{2(2 - C)}\right)\cos\phi +$$

$$\left.\frac{\overline{V}}{2(2 - C)}(\sin(\phi + 2U) - \sin\phi)\right]$$

$$\overline{AO1B} = \frac{2}{\pi}\left[(\overline{AU} - \overline{A2O})\cos U - \sin U + \right. \tag{15}$$

$$\overline{V}\frac{(4 - C)}{2(2 - C)}\sin(\phi + U)\sin U -$$

$$\overline{V}\left(\frac{\pi}{2} + \frac{CU}{2(2 - C)}\right)\sin\phi +$$

$$\left.\frac{2\overline{V}}{(2 - C)}(\cos U - 1)\cos\phi\right]$$

The normalized r.m.s. fundamental component of the output current i$_o$ of FIG. 6 may be expressed as $\overline{AO1}$ and given by the following relationship:

$$\overline{AO1} = \frac{[\overline{AO1A}^2 + \overline{AO1B}^2]^{\frac{1}{2}}}{\sqrt{2}} \tag{16}$$

The normalized reactive r.m.s. component of the A.C. current i$_o$ of FIG. 6 may be expressed as $\overline{AO1J}$ as given by the following relationship:

$$AO1J = [AO1^2 - AO1R^2]^{\frac{1}{2}} \quad (17)$$

The harmonic components ($a_N$ and $b_N$) expressed as $\overline{AN}$ and $\overline{BN}$ in normalized form, respectively, of output current $i_o$ of FIG. 6 are determined by Fourier Analysis; where $N \neq 1$ and $N =$ odd only and are given by the expressions 18 and 19:

$$\overline{AN} = \frac{2}{\pi}\left[\frac{C\overline{V}}{(2-C)(N^2-1)}\left(\sin\phi - \sin(\phi + U)\cos NU + \frac{1}{N}\cos(\phi + U)\sin NU\right) - \frac{1}{N^2}(1 + \cos NU)\right] \quad (18)$$

$$\overline{BN} = \frac{2}{\pi}\left[\frac{C\overline{V}}{(2-C)(N^2-1)}\left(\frac{1}{N}\cos\phi - \sin(\phi + U)\sin NU - \frac{1}{N}\cos(\phi + U)\cos NU\right) - \frac{1}{N^2}\sin NU\right] \quad (19)$$

The normalized r.m.s. harmonics expressed as $\overline{AHN}$ of A.C. current $i_o$ where $N = 3, 5, 7, 9, \ldots$ may be expressed as:

$$\overline{AHN} = \frac{1}{\sqrt{2}}[\overline{AN}^2 + \overline{BN}^2]^{\frac{1}{2}} \quad (20)$$

As mentioned hereinbefore, the described expressions 1, 1B and 2A are solvable by a numerical technique involving a trial and error solution, arrived at through the use of a suitable computer, such as a General Electric time-sharing computer. Expressions 2-20 are then evaluatable. The computer program used to direct the solution derived by the time-sharing computer was written in Fortran 77 language.

Discussion of Computer Analysis with Reference to Program of Appendix A, Flow Charts of FIGS. 7a-7f, Computer Runs of Appendices B and C, and Graph of FIG. 5

The Flow-Chart for visualizing the interrelationships of the computer program is given in FIGS. 7a-7f, whereas, the program listing of the computer program that performed the numerical solution within the environment of the GE time-sharing computer is given in Appendix A. The results achieved by the computer analysis are given in Table 2, to be discussed.

The Flow-Chart of FIGS. 7a-7f starts with the acceptance and reading of the input quantities: C, $\phi$, $\overline{V}$ and DWT (DEG) entered into the computer from an external source, such as a data entry keyboard, and shown by ENTER event of FIG. 7a. Each of the entered quantities has the general description given in Table 1. FIGS. 7a-7f of my Flow-Chart show the interrelationships of the computations involved in the numerical evaluations of expressions 1 through 20.

FIGS. 7a-7f of my Flow-Chart are arranged such that the information flow entering a particular Figure is shown at the top of the Figure, and similarly, the informational flow leaving the Figure is shown to exit at the bottom of that Figure. The information entering or exiting a particular Figure is correlated to the entry point or exit point between Figures by the use of the symbols A ... F. For example, the information exiting FIG. 7a has the symbols A, and this information is shown as entering FIG. 7b at the processing block UL=0 by the use of the symbols A (from FIG. 7a).

Figure 7A:
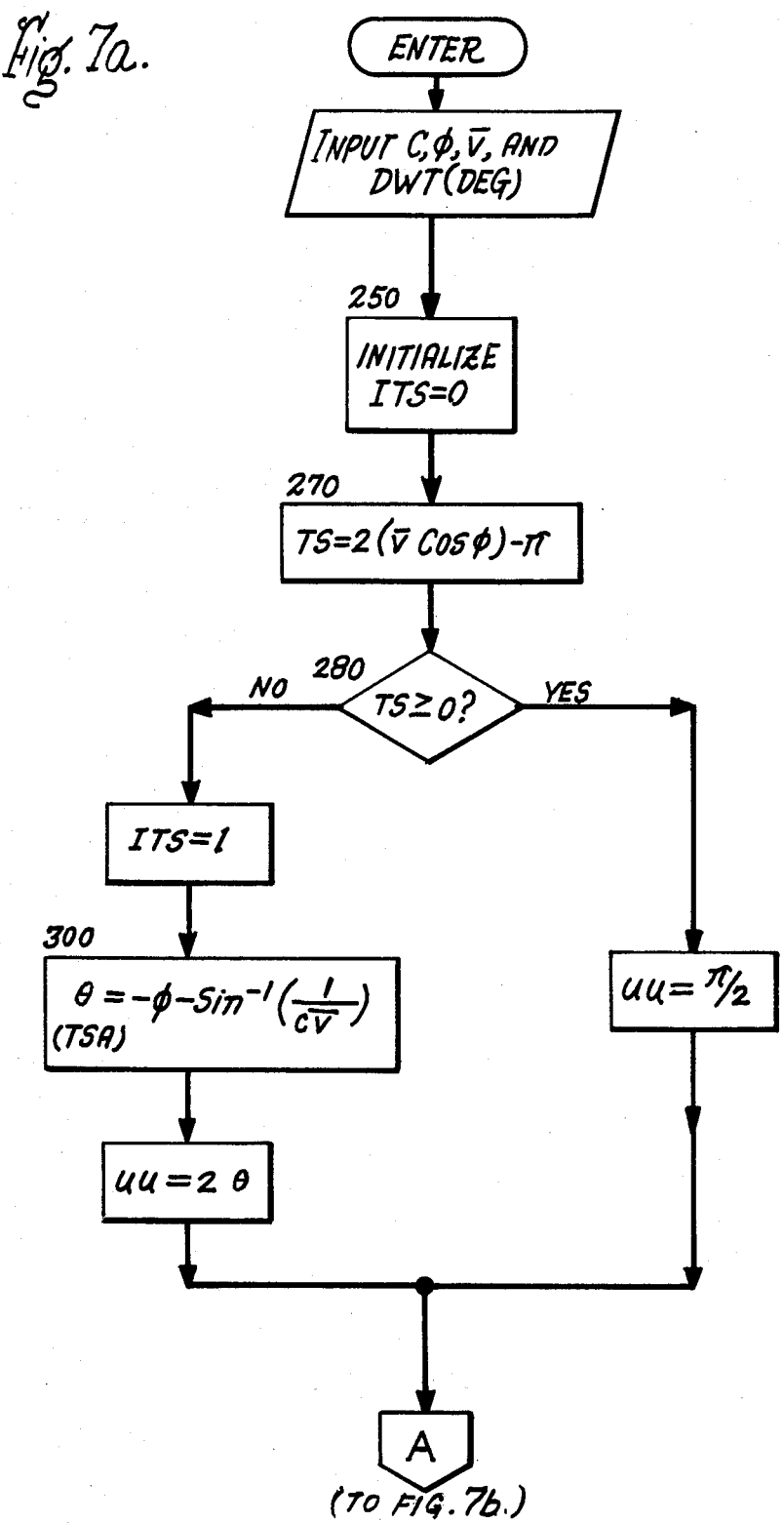
Figure 7B:
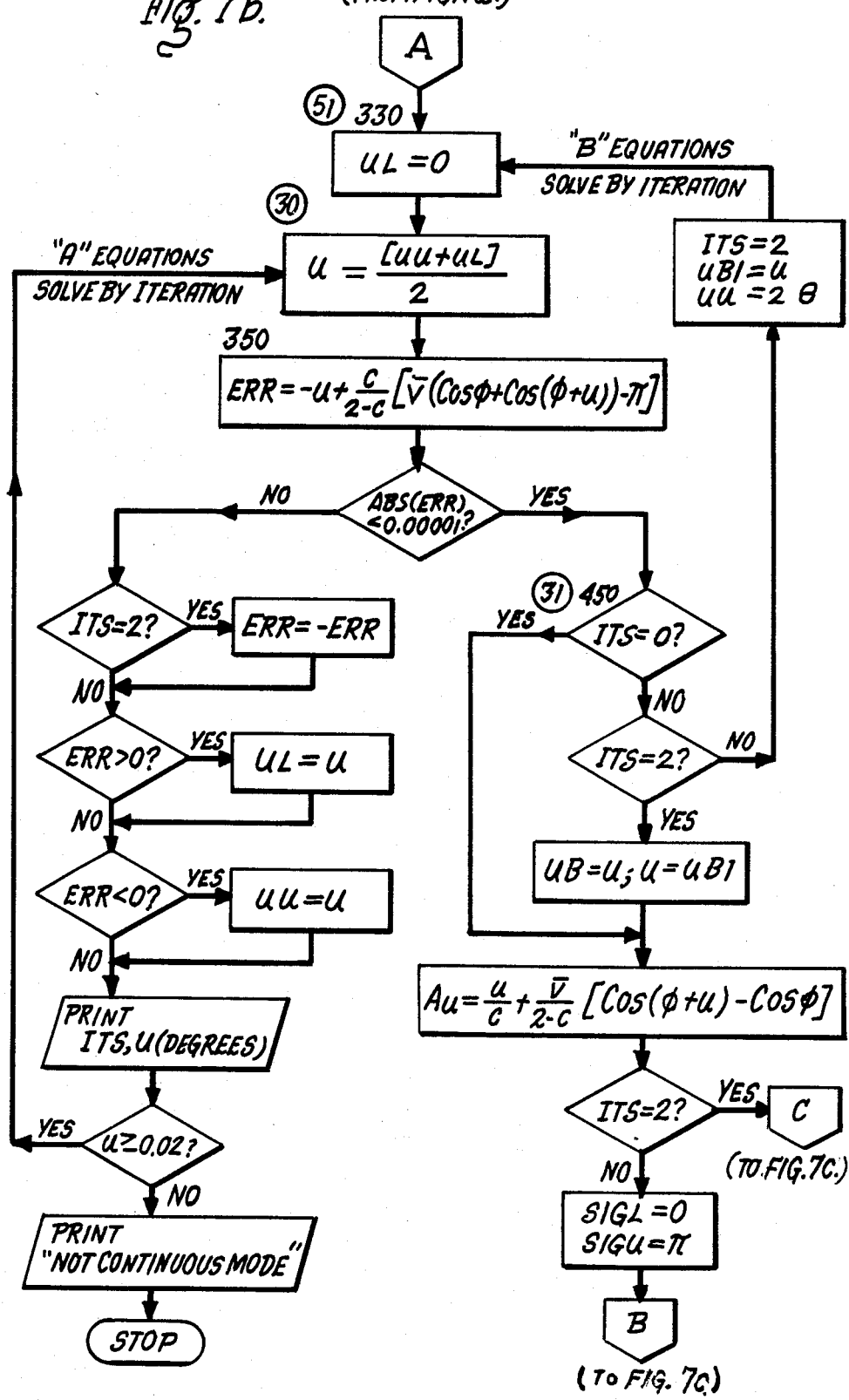
Figure 7D:
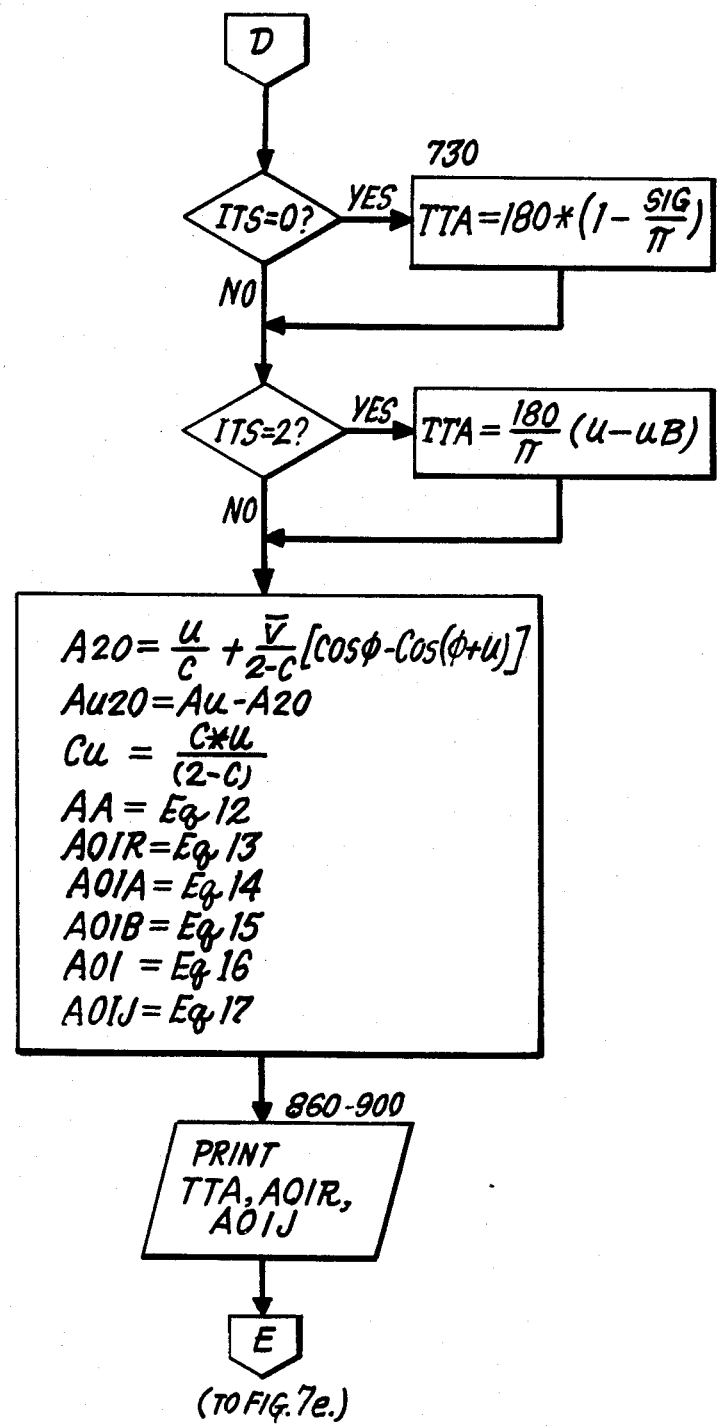
Figure 7E:
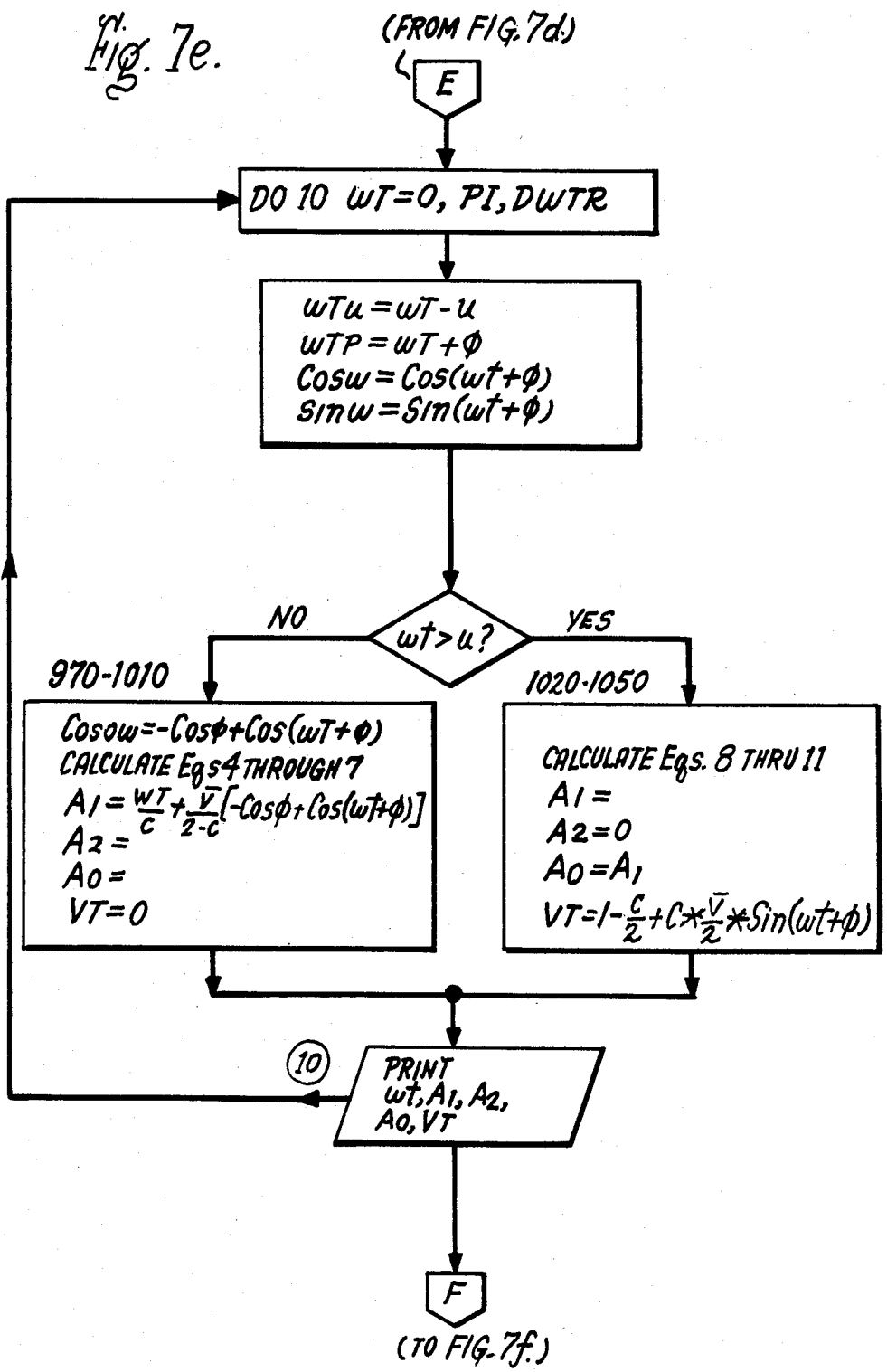
Figure 7F:
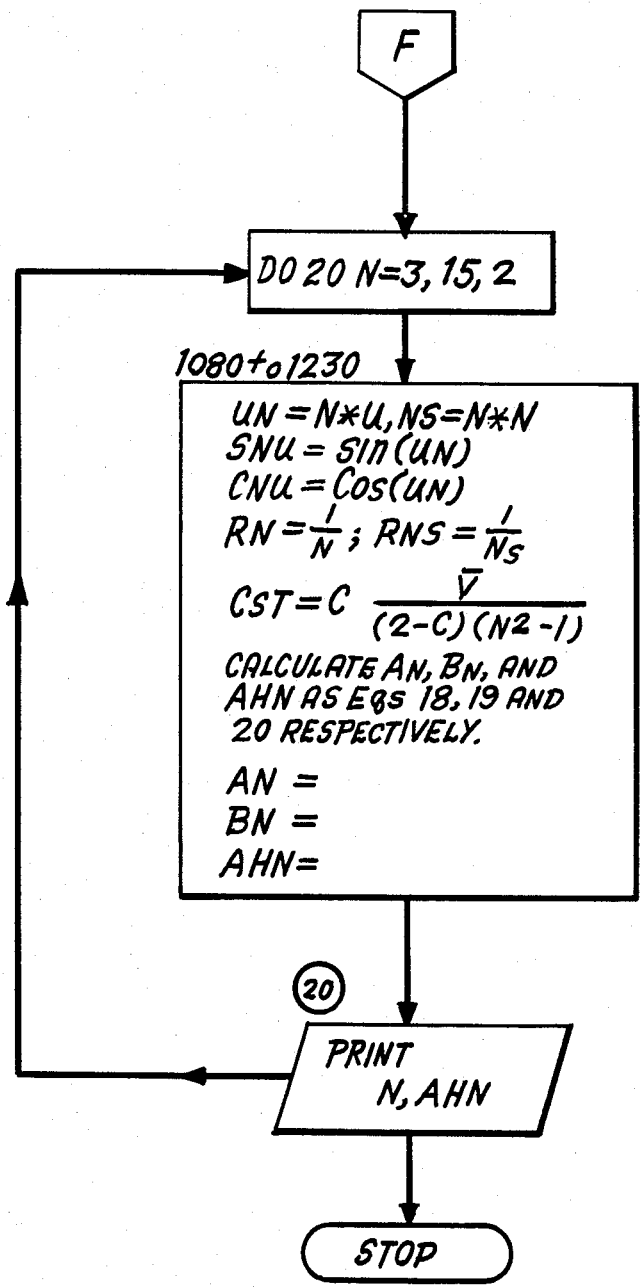

Still further, FIGS. 7a-7f are shown to be interrelated to the computer listing of Appendix A and to the equations hereinbefore derived. For example, the decision block ABS (ERR)<0.00001? of FIG. 7b is shown as related to Line 360 of the computer listing of Appendix A. Similarly, the procession block of FIG. 7d shows its processed functions AA, AO1R, AO1A, AO1B, AO1 and AO1J as related to Eq 12 through Eq 17 respectively.

Further, my Flow Chart shows various exit conditions related to my desired analysis. For example, if the computer program of Appendix A in the performance of its trial and error evaluation of the overlap angle ($\mu$) determines the overlap angle ($\mu$) to be very low or non-existent, such as $\mu \leq 0.02$ shown by one of the decision blocks of FIG. 7b, then the evaluation of ($\mu$) is terminated and the program formats a printout: "NON CONTINUOUS MODE" and then issues a "STOP" command. Although the program of Appendix A stops for such a determination, there is no implication that operation in the non-continuous mode may not be useful for some purposes. However, it should be noted that the harmonic structure of the DC current ($i_1 - i_2$) and of the AC current ($i_o$) is relatively higher in this NON CONTINUOUS MODE.

The control range boundaries are typically illustrated by FIG. 5 and involve three regions:

1. The lower region illustrated by a heavy solid line involves the boundary between the continuous and a discontinuous current region. That boundary is expressed:

$$\overline{V} \geq \pi/2 \cos\phi$$

2. The right side boundary involves the limit of gating angle retard or in essence $\phi$ (maximum) for the purpose of effecting control. Beyond that boundary, adjustment in gating angle $\phi$ exerts no control. That boundary is expressed:

$$\phi_{(max)} = \sin^{-1}[2 - C/C\overline{V}]$$

3. The left side boundary involves the limit of gating angle advance $\phi$ (minimum). As the gating angle approaches this limit, the thyristor turn-off angle TTA approaches zero. It follows that for thyristors requiring a turn off angle TTA $\geq 6$ degrees, the actual minimum gating angle will be slightly greater than $\phi$ (min). This boundary is expressed:

$$\phi_{(min)} = \frac{C\pi}{2-C} - \frac{C\overline{V}}{2-C}\cos\phi_{(min)} - \sin^{-1}\left(\frac{2-C}{C\overline{V}}\right) - \left[\left(\frac{C\overline{V}}{2-C}\right)^2 - 1\right]^{\frac{1}{2}}$$

if case B conditions prevail, i.e., if $2\overline{V}\cos\phi_{(min)} - \pi < 0$; and $$\phi_{(min)} = \frac{C\pi}{2(2-C)} - \frac{C\overline{V}}{2-C}\cos\phi_{(min)} - \cos^{-1}\frac{\pi}{2\overline{V}}$$

if case A conditions prevail, i.e., if $$2 \overline{V} \cos \phi_{(min)} - \pi > 0$$

A portion of the results achieved by the Computer Program of Appendix A operating in a manner shown by the Flow-Chart of FIGS. 7a–7f is given in Table 2.

TABLE 2

| $\overline{V}$ | Case | $\phi°$ | U° | TTA° | A1OR | A1OJ | $\sum_{N=3}^{N=9}$ AION | $\sum_{N=5}^{N=7}$ AION | AI01 | PFI |
|---|---|---|---|---|---|---|---|---|---|---|
| 1.85 | A | −31.4 | 7.0 | 17.0 | .462 | .536 | .108 | .040 | .708 | .653 |
| 2.0 | A | −38.2 | 16.6 | 17.0 | .555 | .708 | .107 | .039 | .900 | .617 |
| 2.25 | B | −47.6 | 29.4 | 16.5 | .700 | 1.018 | .117 | .048 | 1.235 | .567 |
| 2.5 | B | −55.2 | 39.9 | 16.8 | .829 | 1.348 | .143 | .065 | 1.583 | .524 |
| 3.5 | B | −75.8 | 68.0 | 17.2 | 1.224 | 2.772 | .280 | .101 | 3.030 | .404 |
| 5.0 | B | −93.2 | 90.0 | 16.9 | 1.593 | 5.004 | .442 | .113 | 5.251 | .303 |

Table 2 shows the effect of variation of $\overline{V}$ with TTA≃17° and C=1.0 for my invention operating in the inverting quadrant. The inverting quadrant denotes a flow of power from D.C. to A.C. systems, and conversely, a rectifying quadrant, denotes a flow of power from A.C. to D.C. systems. The first seven (7) columns of Table 2 are the results of computer runs based on the Computer Program of Appendix A. The columns 8 and 9 of Table 2 respectively are the vector sums of the 3rd, 5th, 7th, and 9th harmonic components of $i_o$ and of the 5th and 7th harmonic components of the output current of $i_o$ of FIG. 6. The quantity of AI0I is the normalized r.m.s. fundamental component of A.C. current. The quantity PFI of Column 11 of Table 2 is equal to the fundamental frequency power factor.

A review of Table 2, all of which involves inverting operation, reveals that relatively low values of $\overline{V}$ in the range of 1.85 to 3.5 are highly preferred since (i) the power factor (PFI) becomes too low if the $\overline{V}$ is increased above this range and (ii) only a limited region of continuous A.C. current operation is present if $\overline{V}$ is decreased below 1.85. Hence, my converter under normal operating conditions operates with a $\overline{V}$ in the range between 1.85 and 3.5.

Table 2 does not show values of $\overline{V}$ greater than 5 due to the very low power factor involved with high values of $\overline{V}$. Table 2 also does not show values of $\overline{V}$ less than 1.85 since the continuous current control range is limited for lower values of $\overline{V}$.

Table 2 also reveals that if the zero sequence harmonics are inhibited as illustrated by column 9, the remaining harmonics are only of the order of 5% of the fundamental current AI01.

The results of operation of the circuit arrangements of my invention obtained by varying the quantity $\phi$ and holding constant the quantities $\overline{V}=2.25$ and C=1 are shown in Table 3. The data of Table 3 are the results obtained from computer runs using the computer program of Appendix A.

TABLE 3

| $\phi°$ | Case | U° | TTA° | AOIR | AOIJ | PFI | Quadrant |
|---|---|---|---|---|---|---|---|
| −48 | B | 24.3 | 5.5 | .713 | 1.027 | .570 | inverting |
| −47 | B | 33.0 | 25.3 | .679 | 1.005 | .560 | inverting |
| −46 | B | 36.8 | 35.3 | .645 | .986 | .547 | inverting |
| −44 | A | 41.5 | 49.7 | .576 | .953 | .517 | inverting |
| −40 | A | 46.8 | 70.0 | .438 | .904 | .436 | Inverting |
| −32 | A | 51.1 | 98.9 | .179 | .851 | .206 | inverting |
| −25.934 | A | 51.9 | 115.9 | 4.2 × 10⁻⁸ | .841 | ≃00 | essentially no power flow |
| −12 | A | 49.0 | 147.0 | −.339 | .878 | .360 | rectifying |

TABLE 3-continued

| $\phi°$ | Case | U° | TTA° | AOIR | AOIJ | PFI | Quadrant |
|---|---|---|---|---|---|---|---|
| 26 | C | 22.0 | >180.0 | −.715 | 1.028 | .571 | rectifying |

From a review of Table 3 it is noted that the fundamental component of the output current (AOIR) of column 5 of Table 3 responds almost in a linear-like manner by varying the gating angle $\phi$ which is applied to thyristors $T11_A$ and $T11_B$ and $\phi+\pi$ which is applied to $T12_A$ and $T12_B$ for the region of Cases A and B.

Referring further to Table 3, in particular the first column entitled ($\phi$) and the eighth column entitled Quadrant, it should be noted that the Quadrant changes smoothly from (1) an inverting function to (2) a blocking function wherein essentially no power flows, to (3) a rectifying function. These three different functions and a smooth transition between them are achieved by simply varying the gating angle ($\phi$) from −48° to +26°. This result is of primary importance to my inventive concept.

From the above result it is realized that the circuit arrangement 10 of FIG. 1 performs three desired functions achievable by only varying the gating angle $\phi$ which is applied to the thyristors $T11_A ... T12_B$ from an external gate pulse generator 12. The circuit arrangement 10 in response to the variable gating angle $\phi$ functions as, (1) an inverter, (2) as a means for allowing essentially no power between an A.C. system such as $V_P \sin(\omega t + \phi)$ and the D.C. system such as $V_D$ and (3) a rectifier.

A still further review of Table 3 reveals that as the gating angle $\phi$ is advanced in the inverting quadrant, the power flow from the D.C. system to the A.C. system is increased and the fundamental power factor is raised. However, as the power factor is raised by exerting control of the gating angle, the thyristor turn-off angle (TTA) is made smaller. A gating angle advance limit that is compatible with the required thyristor turn-off angle (TTA) must be provided. This is to inhibit too small a turn-off angle that allows the thyristors to inadvertently turn on with reapplied voltage, initiating a shoot-through that requires interruption of the power flow and is highly undesirable. The computer program of Appendix A can be used to determine $\phi$ as a function of TTA for the involved values of C and $\overline{V}$. Therefore an advance gating angle limit $\phi_{(min)}$ can be determined for the appropriate conditions involved in a given application.

Certain characteristics of my inverter are similar to those of the Graetz converter. For example, note that depression of the thyristor turn-off angle (TTA) occurs (as shown in Table 3) as control of the gating angle ($\phi$) is exerted to increase the power factor. Note also that, for both converters, a shoot-through engendered by a deficient turn-off angle interrupts power flow.

It is further revealed by Table 3 for the exemplary case of $\overline{V}=2.25$ and $C=1$ that the range of adjustment of the gating angle $\phi$ with respect to the A.C. system voltage zero is from $\phi=-48$ degrees for full inverting to $\phi=+26°$ for full rectifying, a total adjustment range of $+74$ degrees. The corresponding change in the angle of the A.C. system current with respect to the A.C. system voltage for adjustment from $\phi=-48$ degrees for full inverting where PFI=0.57 to $\phi=+26$ degrees for full rectifying where PFI=0.571 is $-112$ degrees. The relative shift in the A.C. current zero as a result of changing power factor due to gating angle adjustment means that the A.C. system current zero does not provide a stable reference for the gating angle. This is especially so if the converter is operating with the relatively high power factor that my converter is normally operating with. In this regard, all herein-disclosed embodiments of my converter normally operate with a power factor substantially exceeding 0.3 when operating near full inversion or full rectification.

If the parameter C, as defined hereinabove, is approximately 1, then the A.C. system voltage can be directly utilized as a reference for the phase-controlled gate pulse generator (e.g., 12 in FIG. 1), and the A.C. system voltage zero will provide a stable reference for the gating angle.

In the event that the A.C. system and associated transformers involve sufficient reactance as to reduce C to a value substantially less than 1, the A.C. system voltage zero can be determined for the purpose of establishing a stable reference for the gating means by employing the Remote Voltage Sensor of my U.S. Pat. No. 3,968,432.

A still further relationship that may be observed from the results obtained from the computer program of Appendix A is the effect of introducing A.C. system inductance that causes C to be less than 1. In this connection, compare the computer run of Appendix C where the quantity $C=0.7$ with Appendix B, where the quantity $C=1.0$. Each run has the quantities $TTA=1.65\ldots\times 10$ or $16.5°$ and VBAR=2.25. Such a comparison of these runs illustrates that the ratios of real AO1R to reactive AO1J fundamental currents are about the same for each case and the ratios of harmonic to fundamental currents are also similar. My invention is obviously quite usable for either case, although since the actual normalized values are of the order of 10% difference, the C factor must be taken into account in the design stage. For an equal margin angle (TTA=16.5°) the power factor is reduced from 0.567 (C=1) to 0.548 (C=0.7) and control range ($\phi$ for TTA≃16.5°) is shifted slightly, $\phi$ (C=1)=$-47.6°$ while $\phi$ (C=0.7)=$-44.2°$. This is also evident from inspection of FIG. 5 previously discussed.

The Case A or Case C conditions of the thyristors and diodes of FIG. 6 involve bi-directional D.C. system current. The Case B conditions of the thyristors and diodes of FIG. 6 involve unidirectional D.C. system current. Case A conditions of the thyristors and diodes of FIG. 6 are involved at zero power flow, and Case A or Case C conditions are involved in the rectifying quadrant shown with regard to column 8 of Table 3.

Wavetrains for Case B conditions for quantities of $C=1$, $\phi=-47.6°$, $\overline{V}=2.25$ and $TTA=16.5°$ are illustrated in FIG. 8 which is comprised of FIGS. 8a-8f.

Discussion of the Wavetrains of FIG. 8

FIG. 8a shows, plotted against time, the A.C. source voltage $V_P\sin(\omega t+\phi)$ which is applied across the central nodes 20 and 22 of the circuit arrangement of FIGS. 1 and 6. The remaining waveforms of FIGS. 8b-8f are referenced to the $V_P\sin(\omega t+\phi)$ signal of FIG. 8a. FIG. 8a also shows the D.C. voltage $V_D$ of the circuit arrangements of FIGS. 1 and 6 as a straight-like horizontal line.

The forward voltage of thyristors $T12_A$ and $T12_B$ is shown in FIG. 8b as $VT_{12}$. The D.C. current ($i_1-i_2$) of the circuit arrangement of FIGS. 1 and 6 is shown in FIG. 8c. The A.C. current $i_o$ of the circuit arrangement of FIGS. 1 and 6 is shown in FIG. 8d. The current $i_1$ of the circuit arrangement of FIGS. 1 and 6 related to the conduction of thyristors $T11_A$ and $T11_B$ and diodes $D11_A$ and $D11_B$ is shown in FIG. 8e. Similarly, a current $i_2$ of the circuit arrangement of FIGS. 1 and 6 related to the conduction of thyristors $T12_A$ and $T12_B$ and diodes $D12_A$ and $D12_B$ is shown in FIG. 8f.

From FIG. 8d it should be noted that the $i_o$ A.C. current is nearly sinusoidal. This nearly sinusoidal $i_o$ A.C. current developed by the circuit arrangement 10 of FIGS. 1 and 6 is advantageous in that it reduces the amount of filtering required to transform this nearly sinusoidal quantity into a desired final sinusoidal waveform.

Further from FIGS. 8e and 8f it should be noted that the inverse, or diode, current is almost trivial. This diode current is depicted by the portion of the waveform appearing below the abscissa in FIGS. 8e and 8f. For such a trivial current flow it follows that if the diodes are removed from the circuit arrangement of FIGS. 1 and 6, the operation of the circuit of FIGS. 1 and 6 as an inverter is changed only slightly for this gating condition. However, as the gating angle $\phi$ is increased a region of discontinuous output current $i_o$ may be encountered.

Discussion of the Wavetrains of FIG. 9

Various polyphase arrangements, such as FIG. 4 previously described, of the Line-Commutated Resonant Pulse Converter of my invention may also be employed. A three conductor three-phase power system, more particularly, a balanced three-phase three conductor power system, by its inherent nature inhibits the flow of zero sequence harmonic currents. Thus the A.C. current wavetrains of a three phase converter are improved from a harmonic standpoint compared to the single phase converter of FIG. 1, as will be apparent from Table 2 by comparing columns 8 and 9. Column 8 shows the vector sum of the harmonics below the tenth for single phase operation, whereas column 9 shows a corresponding vector sum for three phase operation where the zero sequence harmonics are eliminated.

FIGS. 9a and 9b permit a comparison of the $i_o$ A.C. current (FIG. 9a) with certain zero sequence harmonics and the $i_o$ A.C. current less these zero sequence harmonics (FIG. 9b). The A.C. output currents $i_o$ of FIGS. 9a and 9b are those for $C=1.0$, $\phi=-47.6°$ and $\overline{V}=2.25$ conditions. In FIG. 9a the wavetrain includes the zero sequence harmonics 3, 9, 15, etc., all zero sequence harmonic numbers being integrally divisible by 3. In FIG. 9b the wavetrain has these zero sequence harmonics removed. Such removal obviously reduces the amount of filtering needed with the wavetrain of FIG.

9b in order to develop a substantially pure sinusoidal waveform of current.

The Embodiment of FIG. 10

A further circuit arrangement related to a three-phase power system is shown in FIG. 10, which shows a single transformer T2 (it may also be three separate transformers one for each phase) arranged with a wye-connected primary winding group for connection to the A.C. system, delta connected tertiary windings $T2'_A$, $T2'_B$, $T2'_C$ for circulation of zero sequence harmonics, and three single phase secondary windings $T2_A$, $T2_B$ and $T2_C$ in a circuit arrangement 50. Circuit arrangement 50 comprises a plurality of thyristors, diodes and inductors as the means for coupling the three-phase A.C. system voltages $V_1$, $V_2$ and $V_3$ to and from the D.C. voltage system $V_D$.

The zero sequence harmonic currents generated by my converter flow in the three single phase windings $T2_A$, $T2_B$ and $T2_C$ of transformer T2. Symmetrical three phase operation of my converter (to be described later) causes each of the zero sequence harmonic currents entering the dot side of each of the three phase windings $T2_A$, $T2_B$, and $T2_C$ to be in phase. Since the instantaneous sum of these zero sequence harmonic currents is not zero, they cannot flow out of the wye-connected winding group into the A.C. system represented by voltages $V_1$, $V_2$, and $V_3$. To balance transformer ampere turns, the transformed zero sequence harmonic currents will flow out of the dot sides of the tertiary windings $T2'_A$, $T2'_B$, and $T2'_C$, circulating in the closed delta to counterbalance the zero sequence harmonic currents entering the dot sides of the single phase windings $T2_A$, $T2_B$, and $T2_C$. If the closed delta tertiary winding is not provided, my converter is operable, but the hereindescribed wavetrains are very slightly altered.

The thyristors and diodes of the circuit 50 of FIG. 10 are arranged in similar manner as thyristors $T11_A$ ... $T12_B$ and diodes $D11_A$ ... $D12_B$ of FIG. 1 and also in a similar manner as described for the thyristor and diodes of $V_{A1}$ ... $V_{A6}$ of FIG. 4. The thyristors and diodes of circuit 50 are arranged into twelve groups $V1_A$, $V1_B$, $V2_A$, $V2_B$, $V3_A$, $V3_B$, $V4_A$, $V4_B$, $V5_A$, $V5_B$, $V6_A$ and $V6_B$. Each of these groups $V1_A$ ... $V6_B$ has associated therewith a serially-connected inductor $L1_A$ ... $L6_B$, in a manner corresponding to that described for the groups $V_{A1}$ ... $V_{A6}$ and inductors $L_{A1}$ ... $L_{A6}$ of FIG. 4.

Adjacent inductors $L1_A$ ... $L6_B$ are shown in FIG. 10 as having one of their sides connected together so as to form junctions or nodes 52, 54, 56, 58, 60 and 62. Junctions 52, 54, 56, 58, 60 and 62 are respectively formed by $L2_B$ and $L5_B$, $L5_A$ and $L2_A$, $L6_B$ and $L3_B$, $L3_A$ and $L6_A$, $L4_B$ and $L1_B$ and finally $L1_A$ and $L4_A$. Junctions 62 and 60 are repsectively connected to opposite sides of the single phase winding $T2_C$. Junctions 58 and 56 are respectively connected to opposite sides of the single phase winding $T2_B$. Junctions 52 and 54 are respectively connected to opposite sides of the single phase winding $T2_A$.

FIG. 10 further shows one side of each of the twelve groups of thyristors and diodes $V1_A$ ... $V6_B$ as connected to either the positive terminal of $V_D$ via buss 64 or the negative terminal of $V_D$ via buss 66. The side of the twelve groups $V1_A$ ... $V6_B$ which is connected to buss 64 or 66 is the side not having an associated inductor $L1_A$ ... $L6_B$ connected thereto.

The twelve groups $V1_A$ ... $V6_B$ are arranged in a serial manner across busses 64 and 66 such that, (1) $V1_A$ and $V4_A$ are connected in series across the D.C. busses 64 and 66 and coupled to the voltage $V_1$ via the winding $T2_C$ of transformer T2, (2) $V4_B$ and $V1_B$ are connected in series across the D.C. busses 64 and 66 and coupled to the voltage $V_1$ via single phase winding $T2_C$ of transformer T2, (3) $V3_A$ and $V6_A$ are connected in series across the D.C. busses 64 and 66 and coupled to the $V_2$ voltage via the single phase winding $T2_B$ of transformer T2, (4) $V6_B$ and $V3_B$ are connected in series across the D.C. busses 64 and 66 and coupled to the $V_2$ voltage via the single phase winding $T2_B$ of transformer T2, (5) $V5_A$ and $V2_A$ are connected in series across the D.C. busses 64 and 66 and coupled to the $V_3$ voltage via single phase winding $T2_A$ of transformer T2, and finally (6) $V2_B$ and $V5_B$ are connected in series across the D.C. busses 64 and 66 and coupled to the $V_3$ voltage via the single phase winding $T2_A$ of transformer T2. The diodes of all twelve groups $V1_A$ ... $V6_B$ are connected in a blocking direction with respect to the D.C. busses or terminals.

The arrangement of FIG. 10, more particularly, the arrangement of the transformer T2, is particularly suitable for relatively high voltage applications. The A.C. system voltages $V_1$, $V_2$ and $V_3$ are coupled to the primary windings of T2 which are connected in a wye manner. For relatively low voltage applications (not shown), the AC side windings of transformer T2 may be delta connected and provide the desired circulating path for the zero sequence harmonics of my converter.

The twelve groups are gated in a sequential manner, but with simultaneous gating of those having the same reference numeral, that is, $V_{1A}$ and $V_{1B}$ simultaneously, then $V_{2A}$ and $V_{2B}$ simultaneously, ... finally $V_{6A}$ and $V_{6B}$ simultaneously, then $V_{1A}$ and $V_{1B}$ simultaneously, etc. For steady state operation with a balanced three phase A.C. system of voltages the gating events are displaced by 60 degrees of the A.C. system frequency. The D.C. system current wavetrain is the sum of three D.C. current wavetrains as would be involved with three single phase converters such as shown by FIG. 6. Since each of the "single phase converters" is operated with an A.C. phase displacement of 120 degrees of the A.C. system frequency from each of the other single phase converters, the D.C. system current wavetrain is the sum of three D.C. current wavetrains, each for example such as illustrated by FIG. 8c, and each having a displacement of 120 degrees of A.C. system frequency from the other. This causes the D.C. system current wavetrain to have relatively low ripple, such as for example about 12% peak-to-peak current ripple for operation near the full-advance gating involving the inverting quadrant and near the full-retard gating involving the rectifying quadrant.

The Disconnect Means of FIG. 11

As previously mentioned, disconnect means other than switches 34, 38, and 42 of FIG. 4 may be provided to prevent rectification (via the diodes) if the thyristors, such as those of FIG. 4, $V_{A1}$ ... $V_{A6}$ are not gated. Such disconnect means are shown in FIG. 11, which shows a thyristor 46 coupled to the negative (−) bus of the D.C. system and a separable-contact switch 48 coupled to the positive (+) bus of the D.C. system. Either thyristor 46 or switch 48 can be used as the disconnect means. Switch 48, coupled to the positive (+) bus and the diodes of $V_{A1}$, $V_{A3}$ and $V_{A5}$, illustrates a mechanical disconnect means. FIG. 1 shows corresponding disconnect switches at 48. Thyristor 46, coupled to the negative (−) bus and diodes of $V_{A4}$, $V_{A6}$ and $V_{A2}$, provides a disconnect that is continuously gated or gated at appearance of forward voltage in the operating mode. Gating of the thyristor 46 is discontinued in order to provide disconnection when desired.

The Embodiment of FIG. 12

A still further embodiment of the present invention is shown as a circuit arrangement 70 of FIG. 12. FIG. 12 shows a transformer T5 having three delta-connected primary windings $T5_A$, $T5_B$ and $T5_C$ and three wye-connected secondary windings $T5_D$, $T5_E$ and $T5_F$. Transformer T5 illustrated in FIG. 12 may be three (3) single phase transformers or one three-phase transformer, in either case with wye-connected converter side windings and delta-connected A.C. side windings so as to provide a circulating path for the zero sequence harmonics.

FIG. 12 shows the primary winding $T5_A$, $T5_B$, and $T5_C$ coupled respectively to phases A, B, and C of the transmission line 14. FIG. 12 further shows one side of each of the secondary winding $T5_D$, $T5_E$ and $T5_F$ as coupled together and routed to one normally-opened contact of each switch SW1 and SW2 via a buss 72. The common of switch SW1 is connected to the mid potential of the D.C. system represented by the batteries VDA/2 and VDB/2. The common of SW2 is connected to a junction between capacitors $CO_1$ and $CO_2$ which are similar to capacitors $CO_A$ and $CO_B$ previously discussed with regard to FIG. 4.

The capacitors $CO_1$ and $CO_2$ are shown as coupled across a network formed by a serially arranged inductor $LD_1$, capacitor $CD_1$, capacitor $CD_2$ and inductor $LD_2$, which, in turn, is coupled across a network formed by a plurality of thyristors, diodes and inductors. The inductors $LD_1$ and $LD_2$ and capacitors $CD_1$ and $CD_2$ are respectively similar to the previously discussed inductors $LD_A$ and $LD_B$ and capacitors $CD_A$ and $CD_B$ in FIG. 4.

The thyristors and diodes are connected in inverse-parallel pairs which constitute the six groups or valves $V_7$, $V_8$, $V_9$, $V_{10}$, $V_{11}$ and $V_{12}$. Each of the groups $V_7 \ldots V_{12}$ has associated therewith a serially-connected inductor $L_7 \ldots L_{12}$, respectively. Each of the groups and its associated inductor, e.g., group $V_7$ and inductor $L_7$, constitute a branch of the converter of FIG. 12, which terminology corresponds with that used for describing the other converter. Inductors $L_7$ and $L_{10}$ each have one end coupled together to form a node or junction 78 which is coupled to the other side of the secondary winding $T5_D$. Inductors $L_9$ and $L_{12}$ each have one end coupled together to form a node or junction 80 which is coupled to the other side of the secondary winding $T5_E$. Inductors $L_{11}$ and $L_8$ each have one end coupled together to form a node or junction 82 which is coupled to the other side of the secondary winding $T5_F$.

The six groups $V_7 \ldots V_{12}$ are further arranged in a serial manner amongst themselves. The $V_7$ and $V_{10}$ groups are serially connected across the busses 84 and 86. Buss 84 is connected to the positive terminal of the VDA/2 battery, whereas, buss 86 is connected to the negative terminal of the VDB/2 battery. The batteries VDA/2 and VDB/2 form one battery such as depicted in the $V_D$ system of FIGS. 1 and 2. The $V_9$ and $V_{12}$ groups are serially connected across the busses 44 and 46. The $V_{11}$ and $V_8$ groups are serially connected across busses 44 and 46. The diodes of all the groups $V_7 \ldots V_{12}$ are connected in a blocking direction with respect to the D.C. voltage appearing across the D.C. busses or terminals 84 and 86.

During each cycle of A.C. system voltage, the thyristors of the groups $V_7 \ldots V_{12}$ are sequentially gated at equally spaced instants in the order of their numbering, that is $V_7$, $V_8$, $V_9$, $V_{10}$, $V_{11}$ and then $V_{12}$, in a manner as described for the $V_{A1}$, $V_{A2}$, $V_{A3}$, $V_{A4}$, $V_{A5}$ and $V_{A6}$ of FIG. 4. They are also gated at a controlled phase angle with respect to A.C. system voltage, as with the other embodiments.

If the neutral of transformer T5 is established at mid-D.C. potential via closure of switch SW1, or via the closure of switch SW2 so as to provide a suitable D.C. potential divider, formed by the capacitors $CD_1$, $CD_2$, $CO_1$ and $CO_{12}$ and inductors $CD_1$ and $LD_2$ of FIG. 2, the operation of the FIG. 12 converter is in accordance with the single-phase (A-B) arrangement of FIGS. 1 and 6. If SW1 is open and SW2 is open, the operation is slightly altered.

A most advantageous arrangement for high power applications is the six (6) pulse or three (3) phase double-way line commutated resonant pulse converter of FIG. 12. This arrangement may be used in combinations of two involving 30° phase shift using transformers resulting in twelve (12) pulse operation commonly employed for the Graetz Converters applications.

The line-commutated resonant pulse converter of FIGS. 1 and 6 may be advantageously employed for single-phase applications as an inverter for coupling between a D.C. Power Source such as Solar Cells or Fuel Cells and a utility system, considering the relatively low harmonic structure of the A.C. line current compared to other types of inverters.

The System of FIG. 13 Comprising Three or More Converters

FIG. 13 schematically shows a power system comprising a D.C. circuit 200, which may be a high voltage D.C. circuit, and three converters 204, 206, and 208 coupled to the D.C. circuit. Each of these converters couples an A.C. circuit to the D.C. circuit. More specifically, converter 204 couples A.C. circuit 210 to the D.C. circuit; converter 206 couples A.C. circuit 212 to the D.C. circuit; and converter 208 couples A.C. circuit 214 to the D.C. circuit.

In one embodiment, each of the converters 204, 206, and 208 is of one of the designs shown in any one of FIGS. 4, 10, or 12. All of the converters can be of substantially identical design; or some or all of them may be of different designs from the other(s). For example, the converter 204 can be of the design shown in FIG. 4 or FIG. 10, and the other two converters can be of the design shown in FIG. 12.

Let us first assume that the converters 204 and 206 are acting as rectifiers and the converter 208 is acting as an inverter. Under these conditions, the direction of power flow in converters 204 and 206 is from the a.c. circuits 210 and 212 into the d.c. circuit 200, as represented by the arrows $A_1$ and $A_2$, and the direction of power flow through converter 208 is from the d.c. circuit 200 into the a.c. circuit 214, as represented by the arrow $A_4$. If, for some reason, the A.C. circuit 212, as well as A.C. circuit 214, should require power from the d.c. circuit 200, then the gating angle of the converter 206 would be adjusted so that its operation is changed from rectification to inversion. This would cause the direction of current in the conductors 220 and 222 to reverse, as was described in connection with the detailed embodiments, thus permitting the direction of power flow through converter 206 to be reversed as desired without any switching of the conductors 220, 222 or any attendant disruption in power flow. Moreover, the other two converters 204 and 208 can continue to operate in their original controlled state of inverting or rectifying without interference.

If the converters were the usual Graetz converters, in order to effect the above-described reversal in power flow, it would be necessary to switch the conductors 220 and 222 between the d.c. lines (since the direction of current in such converters cannot be reversed). The required switching arrangement for performing this function is expensive, and the disruption in power flow is usually highly undesirable. This disadvantage is overcome when my converter or converters are used in the system of FIG. 13.

In certain systems having the schematic design depicted in FIG. 3, it is feasible to employ the Graetz design for one of the converters and one or the other of my designs for the remaining converters. If system conditions allow, the Graetz design is always operated in a single controlled state and the other converters shifted between rectifying and inverting as needed. If it should be necessary to sometimes change the controlled state of the Graetz converter in such an arrangement, this converter can be provided with the necessary switching equipment for reversing its D.C. terminals. While such a system does not have all of the flexibility of a system in which all three converters are of my design, such total flexibility may not be of overriding importance for certain applications. At any rate, some of the advantages of employing my design of converter are still available in such a system.

General Comments

All of my above-described converter circuits are intended to normally operate with a power factor exceeding 0.3 when operating near full inversion or near full rectification. In addition, all of them have applied to their nodes between the branches a normalized peak value $\overline{V}$ of the A.C. system voltage in the range of 1.85 to 3.5. (Such nodes are exemplified by the nodes 20 and 22 of FIG. 1 and 32, 36, 40 of FIG. 4). It is in this environment that various features of my converter are most effective in enabling me to attain objects of the invention, as specifically described hereinabove.

While I have shown and described particular embodiments of my invention, it will be obvious to those skilled in the art that various changes and modifications may be made without departing from my invention in its broader aspects; and I, therefore, intend herein to cover all such changes and modifications as fall within the true spirit and scope of my invention.

What I claim is:

1. In a line-commutated converter circuit that: (i) normally operates with a power factor exceeding 0.3 when operating near full inversion or near full rectification, (ii) has two D.C. terminals, one positive and one negative, adapted to be connected to a D.C. system, (iii) has a pair of A.C. terminals adapted to be connected to an A.C. system, and (iv) during normal operating conditions has coupled between two predetermined nodes a normalized peak value $\overline{V}$ of the A.C. system voltage in the range of 1.85 to 3.5;

(a) first, second, third, and fourth branches, each branch comprising the combination of a thyristor and a diode connected in inverse-parallel relationship and an inductor connected in series with the thyristor-diode combination; the first and third branches being connected to said positive D.C. terminal, and the second and fourth branches being connected to said negative D.C. terminal;

(b) means for connecting said first and fourth branches in series across said D.C. terminals, with a first of said predetermined nodes located between said first and fourth branches, and means for connecting said second and third branches in series across said D.C. terminals, with a second of said predetermined nodes located between said second and third branches; the diodes of said four branches being connected in a blocking direction with respect to said D.C. terminals;

(c) a transformer comprising two windings coupled together, means for connecting one of said windings between said nodes and means for connecting the other of said windings across said A.C. terminals;

(d) gating means (i) for triggering the thyristors of said first and second branches into conduction substantially simultaneously to provide a conductive path between said D.C. terminals that extends through said first and second branches via said one winding and (ii) for triggering the thyristors of said third and fourth branches into conduction substantially simultaneously to provide a conductive path between said D.C. terminals that extends through said third and fourth branches via said one winding;

(e) and means for controlling said gating means such that the thyristors of said first and second branches are triggered into conduction at a controlled phase angle with respect to the A.C. system voltage thereafter;

(f) said triggering normally being repeated each cycle of the A.C. system voltage;

(g) said means for controlling the gating means being adjustable over a range that provides for smooth adjustment through zero of the magnitude of the power flow between said A.C. and D.C. systems and for smooth reversal in the direction of said power flow between said A.C. and D.C. systems, (h) the phase angle $\phi$ of the triggering of the thyristors normally being confined to the following limits between a maximum value $\phi_{(max)}$ and a minimum value $\phi_{(min)}$:

$$\phi_{(max)} = \sin^{-1}\left[\frac{2-C}{C\overline{V}}\right]$$

$$\phi_{(min)} = \frac{C\pi}{2-C} - \frac{C\overline{V}}{2-C}\cos\phi_{(min)} -$$

$$\cdot \sin^{-1}\left(\frac{2-C}{C\overline{V}}\right) - \left[\left(\frac{C\overline{V}}{2-C}\right)^2 - 1\right]^{\frac{1}{2}}$$

if $2\overline{V}\cos\phi_{(min)} - \pi < 0$; and $$\phi_{(min)} = \frac{C\pi}{2(2-C)} - \frac{C\overline{V}}{2-C}\cos\phi_{(min)} - \cos^{-1}\frac{\pi}{2\overline{V}}$$

-continued if $2 \bar{V} \cos \phi_{(min)} - \pi > 0$, where C is the ratio of the inductance of the branches of the converter in a conductive path to the total inductive path inductance.

2. The converter circuit of claim 1 in which the means for controlling the gating means causes the period of conduction through the thyristors of said first and second branches to overlap the period of conduction through the thyristors of said third and fourth branches for predetermined intervals when the converter is inverting near full inversion.

3. In a line-commutated converter circuit that: (i) normally operates with a power factor exceeding 0.3 when operating near full inversion or near full rectification, (ii) has two D.C. terminals, one positive and one negative, adapted to be connected to a D.C. system, (iii) has three A.C. terminals adapted to be connected to an A.C. system, and (iv) during normal operating conditions has applied to each of three predetermined nodes a normalized peak value $\bar{V}$ of the A.C. system voltage in the range of 1.85 to 3.5;

(a) first, second, third, fourth, fifth and sixth branches, each branch comprising the combination of a thyristor and a diode connected in inverse-parallel relationship and an inductor-connected in series with the thyristor-diode combination; the first, third and fifth being connected to the positive D.C. terminal and the fourth, sixth, and second branches being connected to the negative D.C. terminal;

(b) means for connecting said first and fourth branches in series across said D.C. terminals, with a first of said predetermined nodes located between said first and fourth branches; means for connecting said third and sixth branches in series across said D.C. terminals, with a second of said predetermined nodes located between said third and sixth branches; and means for connecting said fifth and second branches in series across said D.C. terminals, with a third of said predetermined nodes located between said fifth and second branches; the diodes of said six branches being connected in a blocking direction with respect to said D.C. terminals;

(c) transformer means having a plurality of secondary windings connected between said nodes and a plurality of primary windings coupled to said secondary windings and connected between said A.C. terminals;

(d) gating means for sequentially triggering said thyristors of said branches into conduction in the order of numbering of the branches;

(e) and means for controlling said gating means such that the thyristor of said first branch is triggered into conduction at a controlled phase angle with respect to the A.C. system voltage and such that the thyristor of each successively-triggered branch is triggered into conduction at approximately equal intervals during the succeeding cycle of A.C. system voltage following triggering of the thyristor of the immediately-preceding branch;

(f) said triggering normally being repeated each cycle of the A.C. system voltage;

(g) said means for controlling the gating means being adjustable over a range that provides for smooth adjustment through zero of the magnitude of the power flow between said A.C. and D.C. systems and for smooth reversal in the direction of said power flow between said A.C. and D.C. systems;

(h) the phase angle $\phi$ of the triggering of the thyristors normally being confined to the following limits between a maximum value $\phi_{(max)}$ and a minimum value $\phi_{(min)}$:

$$\phi_{(max)} = \sin^{-1}\left[\frac{2-C}{C\bar{V}}\right]$$

$$\phi_{(min)} = \frac{C\pi}{2-C} - \frac{C\bar{V}}{2-C}\cos\phi_{(min)} - \sin^{-1}\left(\frac{2-C}{C\bar{V}}\right) - \left[\left(\frac{C\bar{V}}{2-C}\right)^2 - 1\right]^{\frac{1}{2}}$$

if $2\bar{V}\cos\phi_{(min)} - \pi < 0$; and $$\phi_{(min)} = \frac{C\pi}{2(2-C)} - \frac{C\bar{V}}{2-C}\cos\phi_{(min)} - \cos^{-1}\frac{\pi}{2\bar{V}}$$

if $2\bar{V}\cos\phi_{(min)} - \pi > 0$, where C is the ratio of the inductance of the branches of the converter in a conductive path to the total inductive path inductance.

4. The converter circuit of claim 1 or 3 in which the following relationship is normally maintained for $\bar{V}$:

$$V \geq \pi/2 \cos\phi.$$

5. A converter circuit according to claim 1 or 3 in which C is in the range of 0.2 to 1.0.

6. The converter circuit of claim 1 or 3 in combination with disconnecting means for disconnecting the converter circuit from the A.C. system under predetermined conditions.

7. The converter circuit of claim 1 or 3 in combination with disconnecting means operable under predetermined conditions to interrupt the flow of current through said diodes, thereby precluding said converter from employing said diodes for rectifying purposes under said predetermined conditions despite energization of said transformer by said A.C. system.

8. The converter circuit of claim 3 in which the means for controlling the gating means causes the following to occur when the converter is operating as an inverter near full inversion: (i) the period of conduction through the thyristor of said first branch overlaps the period of conduction through the thyristor of said fourth branch, (ii) the period of conduction through the thyristor of said fifth branch overlaps the period of conduction through the thyristor of said second branch, and (iii) the period of conduction of the thyristor of said third branch overlaps the period of conduction through the thyristor of said sixth branch.

9. In an electric power system comprising: (i) a D.C. circuit having two conductors of opposite polarity and (ii) three A.C. circuits each having a plurality of conductors, (a) three converters, at least one being as defined in claim 3, respectively connected between (i) a first of said A.C. circuits and said D.C. circuit, (ii) a second of said A.C. circuits and said D.C. circuit, and (iii) a third of said A.C. circuits and said D.C. circuit, (b) the D.C. terminals of each converter being connected to said two conductors of opposite polarity and the A.C. terminals being connected across conductors of the associated A.C. circuit, (c) the direction of D.C. current flow through said one converter being reversed when the operation of said one converter is changed between rectification and inversion.

10. In an electric power system comprising: (i) a D.C. circuit having two conductors of opposite polarity and (ii) three A.C. circuits each having a plurality of conductors, (a) three converters, each as defined in claim 1, respectively connected between (i) a first of said A.C. circuits and said D.C. circuit, (ii) a second of said A.C. circuits and said D.C. circuit, and (iii) a third of said A.C. circuits and said D.C. circuit, (b) the D.C. terminals of each converter being connected to said two conductors of opposite polarity and the A.C. terminals being connected across conductors of the associated A.C. circuit, (c) the direction of current flow through any one of said converters being reversed when the operation of said one converter is changed between rectification and inversion.

11. In an electric power system comprising: (i) a D.C. circuit having two conductors of opposite polarity and (ii) three A.C. circuits each having a plurality of conductors, (a) three converters, each as defined in claim 3, respectively connected between (i) a first of said A.C. circuits and said D.C. circuit, (ii) a second of said A.C. circuits and said D.C. circuit, and (iii) a third of said A.C. circuits and said D.C. circuit, (b) the D.C. terminals of each converter being connected to said two conductors of opposite polarity and the A.C. terminals being connected across conductors of the associated A.C. circuits, (c) the direction of current flow through any one of said converters being reversed when the operation of said one converter is changed between rectification and inversion.

12. In an electric power system comprising: (i) a D.C. circuit having two conductors of opposite polarity and (ii) three A.C. circuits each having a plurality of conductors, (a) three converters, each as defined in either claim 1 or claim 3, respectively connected between (i) a first of said A.C. circuits and said D.C. circuit, (ii) a second of said A.C. circuits and said D.C. circuit, and (iii) a third of said A.C. circuits and said D.C. circuit, (b) the D.C. terminals of each converter being connected to said two conductors of opposite polarity and the A.C. terminals being connected across conductors of the associated A.C. circuit, (c) the direction of current flow through any one of said converters being reversed when the operation of said one converter is changed between rectification and inversion.

13. In an electric power system comprising: (i) a D.C. circuit having two conductors of opposite polarity and (ii) three A.C. circuits each having a plurality of conductors, (a) three converters, at least one being as defined in claim 1, respectively connected between (i) a first of said A.C. circuits and said D.C. circuit, (ii) a second of said A.C. circuits and said D.C. circuit, and (iii) a third of said A.C. circuits and said D.C. circuit, (b) the D.C. terminals of each converter being connected to said two conductors of opposite polarity and the A.C. terminals being connected across conductors of the associated A.C. circuit, (c) the direction of current flow through said one converter being reversed when the operation of said one converter is changed between rectification and inversion.

* * * * *